United States Patent
Sim et al.

(10) Patent No.: US 8,442,262 B2
(45) Date of Patent: May 14, 2013

(54) METHOD AND SYSTEM TO PROCESS A DIGITAL IMAGE

(75) Inventors: Wong Hoo Sim, Singapore (SG); Desmond Toh Onn Hii, Singapore (SG)

(73) Assignee: Creative Technology Ltd., Singapore (SG)

( * ) Notice: Subject to any disclaimer, the term of this patent is extended or adjusted under 35 U.S.C. 154(b) by 1882 days.

(21) Appl. No.: 11/016,366

(22) Filed: Dec. 17, 2004

(65) Prior Publication Data

US 2005/0212930 A1 Sep. 29, 2005

Related U.S. Application Data

(60) Provisional application No. 60/531,029, filed on Dec. 19, 2003.

(51) Int. Cl.
*G06K 9/00* (2006.01)

(52) U.S. Cl.
USPC .......................... 382/100; 348/231.4; 713/176

(58) Field of Classification Search .................. 382/100; 348/231.4; 713/176
See application file for complete search history.

(56) References Cited

U.S. PATENT DOCUMENTS

| | | | |
|---|---|---|---|
| 3,439,598 A | 4/1969 | Weitzner et al. | |
| 4,983,996 A | 1/1991 | Kinoshita | |
| 5,014,078 A | 5/1991 | Kudo et al. | |
| 5,247,330 A | 9/1993 | Ohyama et al. | |
| 5,276,472 A | 1/1994 | Bell et al. | |
| 5,313,235 A | 5/1994 | Inoue et al. | |
| 5,313,564 A | 5/1994 | Kafri et al. | |
| 5,363,157 A | 11/1994 | Cocca | |
| 5,369,261 A | 11/1994 | Shamir | |
| 5,389,989 A | 2/1995 | Hawkins et al. | |
| 5,485,241 A | 1/1996 | Irie et al. | |
| 5,521,663 A | 5/1996 | Norris | |

(Continued)

FOREIGN PATENT DOCUMENTS

| | | |
|---|---|---|
| JP | 2003348327 | 12/2003 |
| JP | 2004153737 | 5/2004 |

(Continued)

OTHER PUBLICATIONS

"U.S. Appl. No. 09/703,510, Advisory Action mailed Jul. 13, 2004", 3 pgs.

(Continued)

*Primary Examiner* — John Strege
(74) *Attorney, Agent, or Firm* — Schwegman Lundberg & Woessner P.A.

(57) ABSTRACT

A method and an apparatus to process a digital image is provided. The method may comprise receiving host image data, receiving audio data and embedding the audio data within the host image data to provide an embedded image wherein the audio data if freely recoverable from the embedded image. The method may comprise processing the audio data using a Short Term Fourier Transformation (STFT) prior to embedding the audio data within the host image data. The method may reduce an amount of digital data that represents an audio signal included in the audio data prior to embedding the audio data within the host image. In one embodiment, the method comprises quantizing magnitude data and discarding phase data of the audio signal to provide the audio data for embedding. The method may comprise quantizing the audio data to match a shell of a $D_4$ Lattice.

22 Claims, 15 Drawing Sheets

U.S. PATENT DOCUMENTS

| | | | |
|---|---|---|---|
| 5,801,848 | A | 9/1998 | Kafri |
| 5,863,209 | A | 1/1999 | Kim |
| 5,867,593 | A | 2/1999 | Fukuda et al. |
| 5,896,403 | A | 4/1999 | Nagasaki et al. |
| 5,897,669 | A | 4/1999 | Matsui |
| 5,996,893 | A | 12/1999 | Soscia |
| 5,999,899 | A | 12/1999 | Robinson |
| RE36,589 | E | 2/2000 | Akamine et al. |
| 6,044,348 | A | 3/2000 | Imade et al. |
| 6,163,656 | A | 12/2000 | Yoshioka |
| 6,229,964 | B1 | 5/2001 | Bell |
| 6,247,649 | B1 | 6/2001 | Nada |
| 6,322,181 | B1 | 11/2001 | Silverbrook |
| 6,332,030 | B1 * | 12/2001 | Manjunath et al. ........... 382/100 |
| 6,388,681 | B1 | 5/2002 | Nozaki |
| 6,460,155 | B1 | 10/2002 | Nagasaki et al. |
| 6,466,262 | B1 | 10/2002 | Miyatake et al. |
| 6,618,511 | B1 | 9/2003 | Mancuso et al. |
| 7,179,982 | B2 * | 2/2007 | Goto ............................... 84/616 |
| 7,248,934 | B1 | 7/2007 | Rossum et al. |
| 7,847,835 | B2 | 12/2010 | Sim et al. |
| 2001/0052542 | A1 | 12/2001 | Matsueda et al. |
| 2002/0057457 | A1 | 5/2002 | Nozaki et al. |
| 2002/0159653 | A1 * | 10/2002 | Dekel et al. ................... 382/282 |
| 2003/0015587 | A1 | 1/2003 | Tsikos et al. |
| 2003/0048946 | A1 * | 3/2003 | Foote et al. .................... 382/173 |
| 2004/0200337 | A1 | 10/2004 | Abe et al. |
| 2005/0041120 | A1 | 2/2005 | Miller |
| 2005/0185069 | A1 | 8/2005 | Sim et al. |
| 2005/0241465 | A1 * | 11/2005 | Goto ............................... 84/616 |
| 2011/0043832 | A1 | 2/2011 | Sim et al. |

FOREIGN PATENT DOCUMENTS

| | | |
|---|---|---|
| JP | 2004163485 | 6/2004 |
| JP | 2004173172 | 6/2004 |
| WO | WO-99/55037 | 10/1999 |
| WO | WO0217214 A2 | 2/2002 |

OTHER PUBLICATIONS

"U.S. Appl. No. 09/703,510, Final Office Action mailed Apr. 7, 2004", 6 pgs.

"U.S. Appl. No. 09/703,510, Final Office Action mailed Jul. 12, 2006", 18 pgs.

"U.S. Appl. No. 09/703,510, Final Office Action mailed Aug. 19, 2005", 17 pgs.

"U.S. Appl. No. 09/703,510, Non-Final Office Action mailed Feb. 8, 2006", 16 pgs.

"U.S. Appl. No. 09/703,510, Non-Final Office Action mailed Oct. 24. 2003", 13 pgs.

"U.S. Appl. No. 09/703,510, Non-Final Office Action mailed Nov. 3, 2004", 16 pgs.

"U.S. Appl. No. 09/703,510, Notice of Allowance mailed Mar. 16, 2007", 4 pgs.

"U.S. Appl. No. 09/703,510, Response filed Jan. 22, 2004 to Non-Final Office Action mailed Oct. 24, 2003", 16 pgs.

"U.S. Appl. No. 09/703,510, Response filed Feb. 1, 2005 to Non-Final Office Action mailed Nov. 3, 2004", 13 pgs.

"U.S. Appl. No. 09/703,510, Response filed May 1, 2006 to Non-Final Office Action mailed Feb. 8, 2006", 9 pgs.

"U.S. Appl. No. 09/703,510, Response filed Jun. 3, 2004 to Final Office Action mailed Apr. 7, 2004", 10 pgs.

"U.S. Appl. No. 09/703,510, Response filed Nov. 13, 2006 to Final Office Action mailed Jul. 12, 2006", 15 pgs.

"International Application Serial No. PCT/SG2004/000419, International Preliminary Report on Patentability mailed Nov. 11, 2005", 7 pgs.

"International Application Serial No. PCT/SG2004/000419, International Search Report mailed Mar. 9, 2005", 4 pgs.

Giannoula, A., et al., "Compressive Data Hiding for Video Signals", *Proc. 2003 International Conference on Image Processing*, (Sep. 2003), 529-32.

Giannoula, A., et al., "Integrating Compression with Watermarking on Video Sequences", *Proc. 2004 International Conference on Information Technology*, (Apr. 2004), 159-60.

Mukherjee, Debargha, et al., "A Source and Channel Coding Approach to Data Hiding with Application to Hiding Speech in Video", *Proc. 1998 International Conference on Image Processing*, (Oct. 1998), 348-52.

Swanson, Mitchell D., et al., "Data Hiding for Video-in-Video", *Proc. 1997 International Conference on Image Processing*, (Oct. 1997), 676-9.

Swanson, Mitchell D., et al., "Multimedia Data-Embedding and Watermarking Technologies", *Proc. IEEE (Special Issue on Multimedia Signal Processing)* 86(6), (Jun. 1998), 1064-87.

"Terminal Equipment and Protocols for Telematic Services: Information Technology—Digital Compression and Coding of Continuous-Tone Still Images—Requirements and Guidelines", International Telecommunication Union Recommendation T.81, (1993), 186 pages.

Chae, J. J., et al., "A Technique for Image Data Hiding and Reconstruction without Host Image", *Proceedings of the SPIE*, 3657, San Jose, CA, (Jan. 1999), 386-396.

Chen, Brian, et al., "Quantization Index Modulation: A Class of Provably Good Methods for Digital Watermarking and Information Embedding", *IEEE Transactions on Information Theory*, 47(4), (May 2001), 1423-1443.

Cho, Youngkwan, et al., "Multiring Fiducial Systems for Scalable Fiducial-Tracking Augmented Reality", *Presence*, 10(6), Dec. 6, 2001, 599-612.

Conway, J. J., et al., "Fast quantizing and decoding and algorithms for lattice quantizers and codes", *IEEE Transactions in Information Theory*, 28(2), (Mar. 1982), 227-232.

Gortler, Steven J., et al., "The Lumigraph", *International Conference on Computer Graphics and Interactive Techniques, Proceedings of the 23rd annual conference on Computer graphics and interactive techniques*, (1996), 43-54.

Griffin, Daniel, "Signal Estimation from Modified Short-Time Fourier Transform"; *IEEE Transactions on Acoustics, Speech, and Signal Processing*, vol. ASSP-32, No. 2, (Apr. 1984), 236-243.

Jacobsen, N., et al., "Image Adaptive High Volume Data Hiding Based on Scalar Quantization", *IEEE MILCOM 2002. Proceedings*, vol. 1, (Oct. 7-10, 2002), 411-415.

Mukherjee, D., et al., "A source and channel-coding framework for vector-based data hiding in video", *IEEE Trans. on Circuits and Systems for Video Technology*, 10(4), (Jun. 2000), 630-645.

Princen, John, "Analysis/Synthesis Filter Bank Design Based on Time Domain Aliasing Cancellation", *IEEE Transactions on Acoustics, Speech, and Signal Processing*, vol. ASSP-35, No. 5, (Oct. 1986), 1153-1161.

Rubin, Philip, "The Pattern Playback", http://www.haskins.yale.edu/haskins/MISC/PP/pp.html, (Nov. 10, 2003), 5 pages.

Solanki, K., et al., "High-volume data hiding in images: Introducing perceptual criteria into quantizatuion based embedding", *Proceedings of ICASSP*, (May 2002), 1-4.

Vail, Mark, "Keyboard Reports: MetaSynth Bundle", http://www.keyboardonline.com/demos/metashythbundle/index.shtml.

Wolfgang, Raymond B., et al., "Perceptual Watermarks for Digital Images and Video", *Proceedings of the IEEE*, 87(7), (Jul. 1999), 1108-1126.

"U.S. Appl. No. 11/016,333, Non-Final Office Action mailed May 12, 2009", 14 pgs.

"U.S. Appl. No. 11/016,333, Final Office Action mailed Dec. 11, 2009", 16 pgs.

"U.S. Appl. No. 11/016,333, Response filed Aug. 5, 2009 to Non Final Office Action mailed May 12, 2009", 11 pgs.

"U.S. Appl. No. 11/016,333, Advisory Action mailed Feb. 26. 2010", 2 pgs.

"U.S. Appl. No. 11/016,333, Response filed Feb. 11, 2010 to Final Office Action mailed Dec. 11, 2009", 13 pgs.

"U.S. Appl. No. 11/016,333, Response filed Apr. 24, 2009 to Restriction Requirement mailed Feb. 26, 2009", 6 pgs.

"U.S. Appl. No. 11/016,333, Restriction Requirement mailed Feb. 26, 2009", 6 pgs.

"U.S. Appl. No. 09/703,510, Response filed Nov. 21, 2005 to Final Office Action mailed Aug. 19, 2005", 14 pgs.

"U.S. Appl. No. 11/016,333, Non-Final Office Action mailed Apr. 16, 2010", 16 pgs.

"U.S. Appl. No. 11/016,333, Notice of Allowance mailed Sep. 7, 2010", 10 pgs.

"U.S. Appl. No. 11/016,333, Response filed Jul. 16, 2010 to Non Final Office Action mailed Apr. 16, 2010", 10 pgs.

"U.S. Appl. No. 12/915,565, Preliminary Amendment filed Nov. 4, 2010", 4 pgs.

* cited by examiner

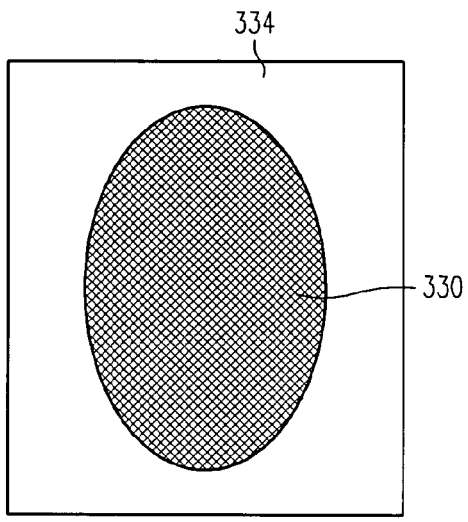
FIG. 13A  FIG. 13B
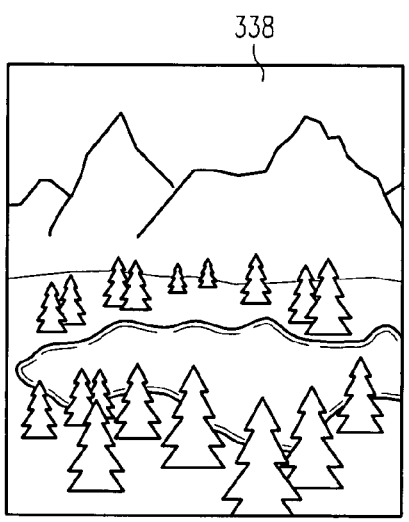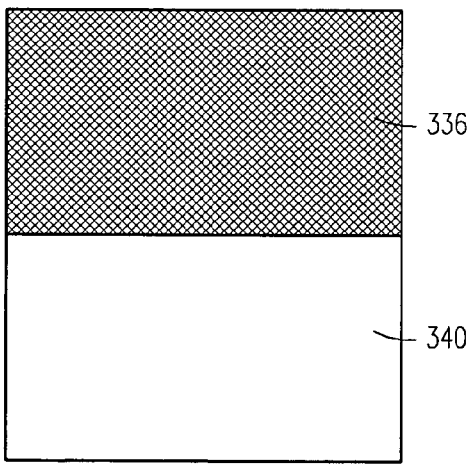
FIG. 14A  FIG. 14B

METHOD AND SYSTEM TO PROCESS A DIGITAL IMAGE

RELATED APPLICATIONS

The present application claims priority benefit from U.S. Provisional Patent Application 60/531,029 entitled "Method and System to Process a Digital Image" filed on Dec. 19, 2003, the contents of which is incorporated herein by reference.

FIELD OF THE INVENTION

The present invention relates generally to the field of digital signal processing and, more specifically, to a method and system to process a digital image e.g., a digital still image.

BACKGROUND OF THE INVENTION

Digital networks are becoming increasingly popular in offering multimedia resources to consumers. However, enforcement of ownership rights in the multimedia content is of primary concern as the digital media is distributed for profit. Methods of watermarking and data hiding are known in the prior art to offer solutions to the problem of illegal distribution of the digital media. The goal in these applications is to ensure that the hidden data can only retrieved by a person if he or she is authorized to do so. Data hiding is generally applied when large amounts of data are to be hidden as opposed to digital watermarking where a small amount of specific identification information is provided.

Thus, digital video processing methods to date have focused on identifying multimedia using watermarking and digital signatures. However, digital signatures may not be validated without special software or key that is provided only to a single authorized person, or limited group of authorized persons. In certain circumstances, watermarking by itself, as oppose to encryption, may not be secret as the primary objective of watermarking is to survive tampering. Of course, watermark can also be encrypted.

SUMMARY OF THE INVENTION

In accordance with the invention there is provided a method to process a host image, the method comprising:
  receiving the host image;
  receiving audio data; and
  embedding the audio data within the host image to provide an embedded image wherein the audio data is freely recoverable from the embedded image.

The method may comprise reducing an amount of digital data that represents an audio signal included in the audio data prior to embedding the audio data within the host image. In one exemplary embodiment, the method comprises transforming the audio data using a Short-Term Fourier Transform, quantizing magnitude data and discarding phase data of the audio signal to provide the audio data for embedding. The audio data may be quantized and mapped to a $D_4$ Lattice code. The lattice code of the $D_4$ Lattice may be scaled to minimize distortion of the host image.

In one exemplary embodiment, the method comprises separating luminance data and chrominance data of the host image, including the audio data in the luminance data to provide modified luminance data, and combining the modified luminance data and the chrominance data to provide the embedded image.

The method may comprise processing the luminance data to provide intermediate luminance data, performing perceptual adaptation to at least one subband of the intermediate luminance data to provide a perceptually adapted subband, and including the audio data in the perceptually adapted subband to provide the modified luminance data.

In one exemplary embodiment, the method comprises removing the at least one subband from the intermediate luminance data to provide further intermediate luminance data. The perceptually adapted subband may be combined with the further intermediate luminance data to provide the modified luminance data. An inverse transform may be performed on the modified luminance data, and the luminance data that has been inverse transformed may be combined with the chrominance data to provide an embedded host that defines the digital image. The luminance data may processed by a discrete wavelet transform or a discrete cosine transform. The audio data may be quantized and scaled based on coefficients of a subband of the host image.

In one exemplary embodiment, the method includes masking a portion of the host image, and reserving the masked portion for host image data. In other embodiments, the method includes masking a portion of the host image to provide a masked portion and an unmasked portion, and embedding the audio data in both the masked portion and the unmasked portion, wherein more audio data is stored per pixel in the unmasked portion than the masked portion. The image may be a digital photograph.

The invention extends to a method to process an embedded image to extract audio data, the method comprising:
  performing one of a discrete wavelet transform and a discrete cosine transform on a luminance component of the embedded image;
  identifying quantized magnitude data associated with the audio data;
  estimating phase data associated with the identified magnitude data; and
  generating an output audio signal based on the quantized magnitude data and the phase data.

The method may comprise estimating a scale for each lattice code included in the embedded image, and scaling the lattice codes to normalize it to provide the quantized magnitude data. In one exemplary embodiment, prior to identifying the quantized magnitude data, the method comprises extracting lattice channel codes from encoded subbands, estimating a scale from a largest absolute value of each code, finding a match from a $D_4$ lattice code, and inverse quantizing the match to provide STFT magnitude data.

The method may comprise modeling the audio data as a set of known values, each known value having a corresponding weight which represents a level of confidence in the known value, and wherein a zero weight indicates an unknown value and an extracted STFT magnitude of the audio data is regarded as known value. Each weight may be modeled as a function of a distance between an extracted noisy lattice code and its nearest lattice code.

Further in accordance with the invention, there is provided a system to process a host image, the system comprising:
  image processing circuitry to receive the host image;
  audio processing circuitry to receive audio data; and
  an embedding module to embed the audio data within the host image to provide an embedded image wherein the audio data if freely recoverable from the embedded image.

The invention extends to a system to extract audio data from a host image, the system comprising:

image processing circuitry to receive the host image and provide a luminance component of the host image; and
audio processing circuitry to extract the audio data from the luminance component and provide audio data that is freely extractable.

The system may comprise a discrete wavelet transform module to perform a discrete wavelet transform on a luminance component of the host image, an identification module to identify quantized magnitude data associated with the luminance component, and a phase recovery module to estimate phase data associated with the identified magnitude data and generate an output audio signal based on the quantized magnitude data and the phase data.

The invention also extends to a machine-readable medium embodying a sequence of instructions that, when executed by a machine, cause the machine to execute any one or more of the method described herein or that is configured to implement any one or more of the systems described herein. The invention also extends to digital camera and a mobile telephone including the digital camera.

Other features of the present invention will be apparent from the accompanying exemplary drawings and description that follow.

BRIEF DESCRIPTION OF THE DRAWINGS

The invention is illustrated by way of example, and not limitation, in the figures of the accompanying drawings, in which like references indicate the same or similar features unless otherwise indicated.

In the drawings,

FIGS. 13A, 13B, 14A and 14B show exemplary host images and exemplary associated masks that define portions of an image where audio embedding is excluded;

DETAILED DESCRIPTION

A method and a system to process digital image data are described. In the following description, for purposes of explanation, numerous specific details are set forth in order to provide a thorough understanding of the present invention. It will be evident, however, to one skilled in the art that the present invention may be practiced without these specific details. The invention is described, by way of example, with reference to embedding and extracting audio data in and from a still image such as a photograph or "snap-shot" taken by a digital camera. It will, however, be appreciated that invention may apply in any digital signal processing applications including video and other multi-media environments.

In one exemplary embodiment of the invention, a method and a system to embed an audio signal (e.g., a speech signal) in a color host image, such as a still image, are provided. As described in more detail below, the magnitudes of a short term Fourier transform (STFT) of the audio signal may be Lattice-coded and injected into a subband of a host image's wavelet transform or discrete cosine transform. In one embodiment of the invention, a "talking picture" may be provided that may be captured and/or played back using any computer or processing device such as, but not limited to, a Personal Digital Assistant (PDA), a cellular telephone, a digital camera, a Personal Computer (PC) or the like. However, by way of example, the invention is described with reference to a digital camera. Further, it will be appreciated that the digital camera, or any components thereof, described herein may be included in a PDA, cellular telephone, web camera, or any other computer or processing device.

Figure 1:
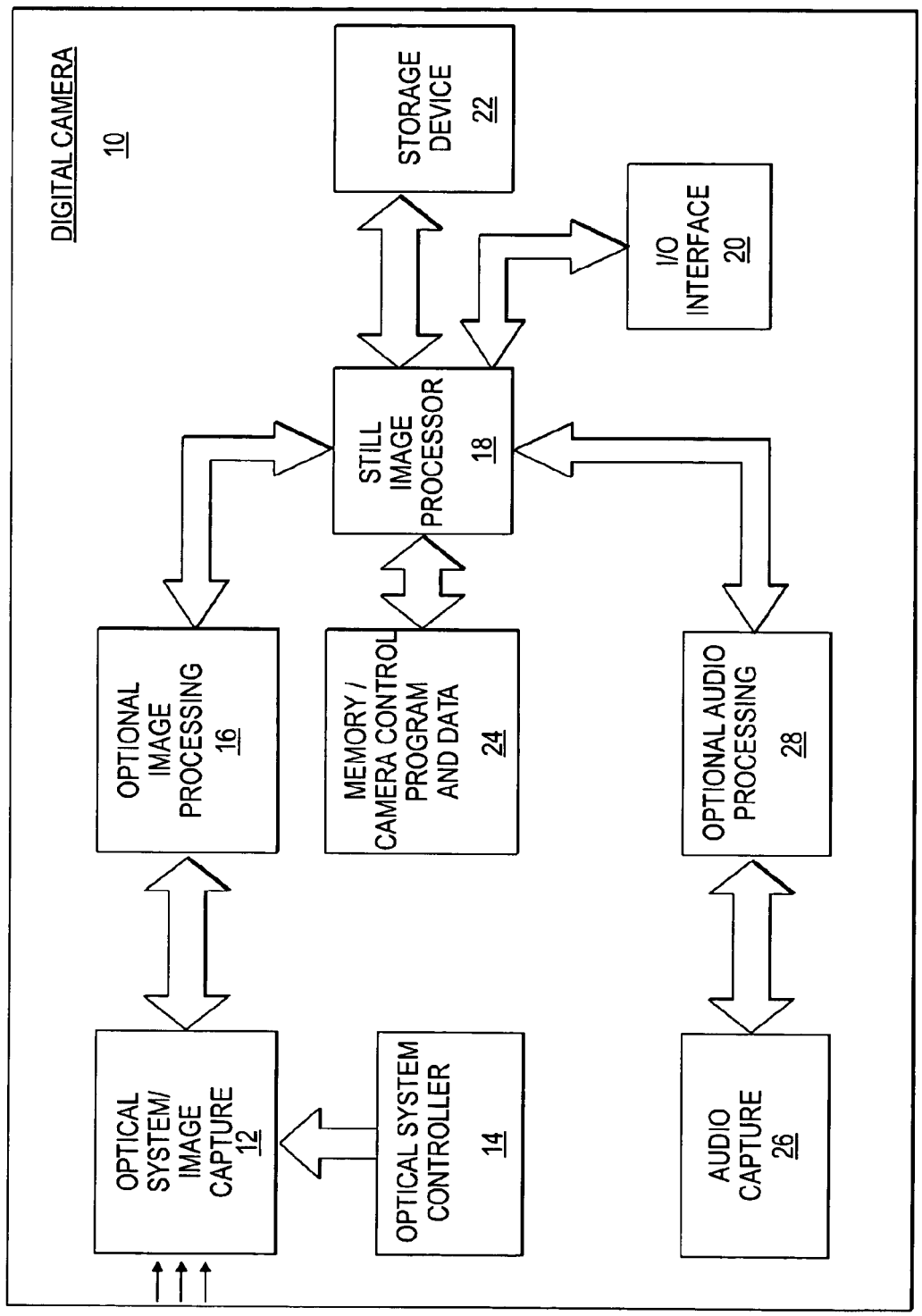
FIG. 1 shows a schematic block diagram of an exemplary digital camera, in accordance with the invention.

Referring in particular to FIG. 1, reference numeral 10 generally indicates an exemplary digital camera, in accordance with an exemplary embodiment of the invention. The camera 10 is shown to include an optical system or image capture module 12 for capturing images. Accordingly, the camera 10 may include an optical system controller 14 to control the image capture module 12 and, optionally, an image processing module 16 to process digital signals (e.g. in the form of digital data) received from the image capture module 12. The image capture module 12 may, for example, be a conventional CCD detector or the like. In one embodiment, the image capture module 12 captures still host images or "photographs" which are then fed into a still image processor 18 for processing. The still images may then be communicated to an external device via an I/O interface 20 and/or stored on a removable storage device 22. In order to control operation of the digital camera 10, a memory/camera control program and data module 24 may be provided.

In order to capture audio such as speech or the like, the camera 10 includes an audio capture module 26 and, optionally, an audio processing module 28. Audio data may then be fed into the still image processor 18 which then, as described in more detail below, embeds the audio data in the host image captured by the image capture module 12. It will be appreciated that the various modules shown in FIG. 1 are merely exemplary modules, and that further or other modules may be included in different embodiments of the exemplary digital camera 10. For example, a digital camera provided within a cellular telephone may include different modules to facilitate integration into the cellular telephone. Further, for example, the digital camera 10 may include other modules to facilitate integration of the camera 10 into a PDA, web camera or the like. Thus, it will be appreciated that the exemplary digital camera 10 may include different modules depending upon the particular application of the camera, e.g., as a stand-alone camera, a PDA, a cellular telephone camera, or the like.

Figure 2:
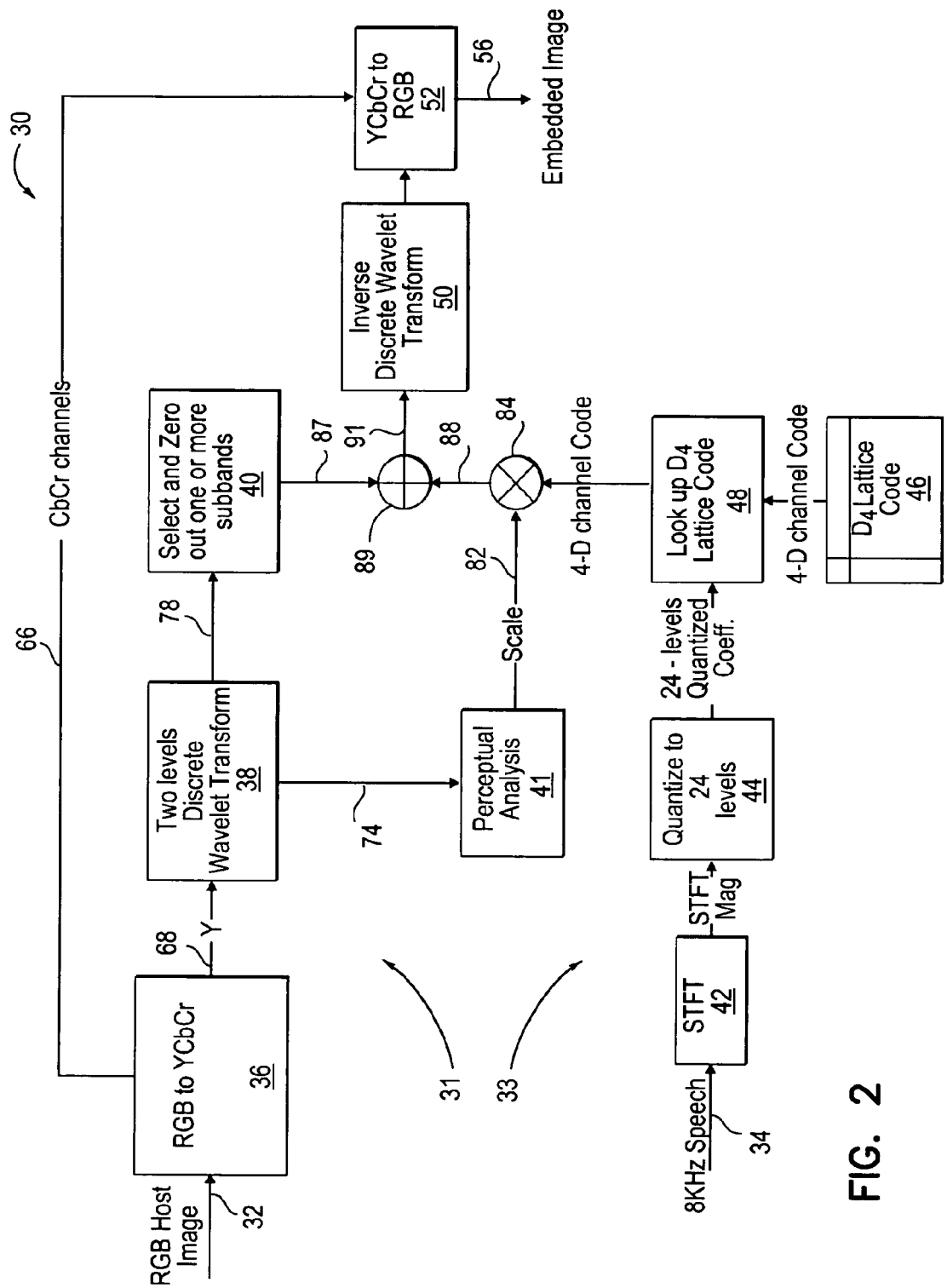
FIG. 2 shows a schematic block diagram of exemplary functional units of an embodiment of an image processing system, in accordance with the invention, for processing a digital image.

Referring to FIG. 2, reference numeral 30 generally indicates an exemplary system, in accordance with an embodiment of the invention, to process an image to embed audio data therein. In one embodiment, the image is a still image and the system 30 may be included within the still image processor 18 of the digital camera 10. It will, however, be appreciated that the system 30 may be provided as a stand-alone unit or integrated within any other computer device that captures a host image (still or video).

The system 30 includes a plurality of functional modules to process a RGB host image signal (or data) 32 and an audio signal in the exemplary form of a speech signal (or data) 34. Although the system 30 is shown to include a plurality of discrete functional modules, it will be appreciated that various modules may be combined or integrated into a single functional unit and, further modules may also be included in other embodiments. Further, the captured host image may be in another format and is not restricted to an RGB image. In the exemplary system 30, the various modules may be provided by image processing circuitry 31 and audio processing circuitry 33.

The exemplary system 30 is shown to include a RGB to YCbCr conversion module 36, a discrete wavelet transform module 38, a filter module 40, a perceptual analysis module 41, a Short Tern Fourier Transform (STFT) module 42, a quantizer module 44, a $D_4$ Lattice code module 46, a look-up module 48, an inverse discrete wavelet transform module 50, and a YCbCr to RGB conversion module 52. As described in more detail below, in one exemplary embodiment the system 30 allows graceful audio degradation wherein only a magnitude of a STFT is encoded and embedded in the host image. Further, the system 30 may use an adaptive Lattice code to encode the audio data as described in more detail below.

Figure 3:
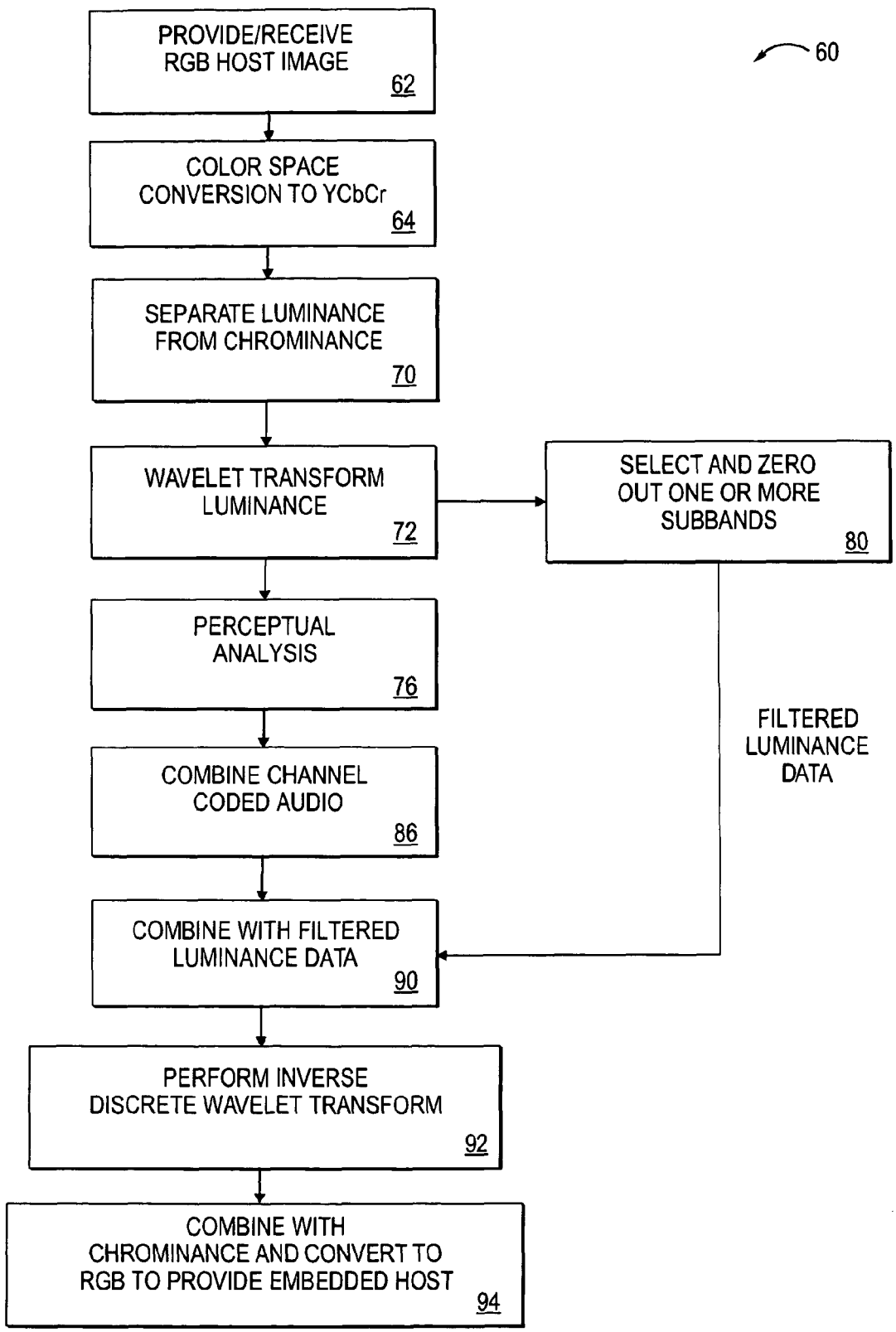
FIG. 3 shows a schematic flow diagram of an exemplary method, in accordance with the invention, to process a digital image.

FIG. 3 shows an exemplary method 60, in accordance with the invention, to process a digital image by embedding audio data in a host image such as the RGB host image signal 32. Although the method 60 may apply to any device for processing any digital image to include audio data in host image data, the method 60 is described, by way of example, with reference to the system 30.

As shown at operation 62, the system 30 receives the RGB host image signal 32 and, thereafter, color space conversion is performed at operation 64 to convert RGB components (or data) to Y, Cb, and Cr, channels (see the RGB to YCbCr conversion module 36). Thus, after the color space conversion, the RGB host image signal 32 is converted into separate chrominance and luminance channels or components 66, 68, respectively (see operation 70 in FIG. 3). The chrominance and luminance channels 66, 68 may be defined by digital data.

The method 60 then performs an exemplary two-level discrete wavelet transform at operation 72 to provide intermediate luminance data 74 that is fed into the perceptual analysis module 41 (see operation 76). The perceptual analysis in operation 76 may use perceptual information based on human visual system models so that the audio data embedded in the host image alters the host image as little as possible when viewed by the human eye. In one embodiment of the invention, the perceptual analysis module 41 may use techniques similar to those that have to date only been applied in digital watermarking. Further, intermediate luminance data 78 is fed into the filter module 40 to select and filter (e.g., zero out) one or more subbands (see operation 80) to provide filtered luminance data 87.

Returning to the perceptual analysis in operation 76, perceptually adapted luminance subband data 82 is combined with audio data at 84 (see operation 86) to provide perceptually adapted audio data 88. Thereafter, as shown at 89, the perceptually adapted audio data 88 is combined with the filtered luminance data 87 to provide modified luminance data 91 (see operation 90). As shown at operation 92, an inverse discrete wavelet transform (see inverse discrete wavelet transform module 50) is performed on the modified luminance data 91.

The modified luminance data 91 that has been inverse transformed with the inverse discrete wavelet transform module 50 is then combined with the chrominance component 66 and converted from YCbCr to RGB components at the YCbCr to RGB conversion module 52. A processed output or embedded image 56 of the YCbCr to RGB conversion module 52 is thus the RGB host image signal (or data) 32 with the audio signal (or data) 34 embedded therein.

Figure 7:
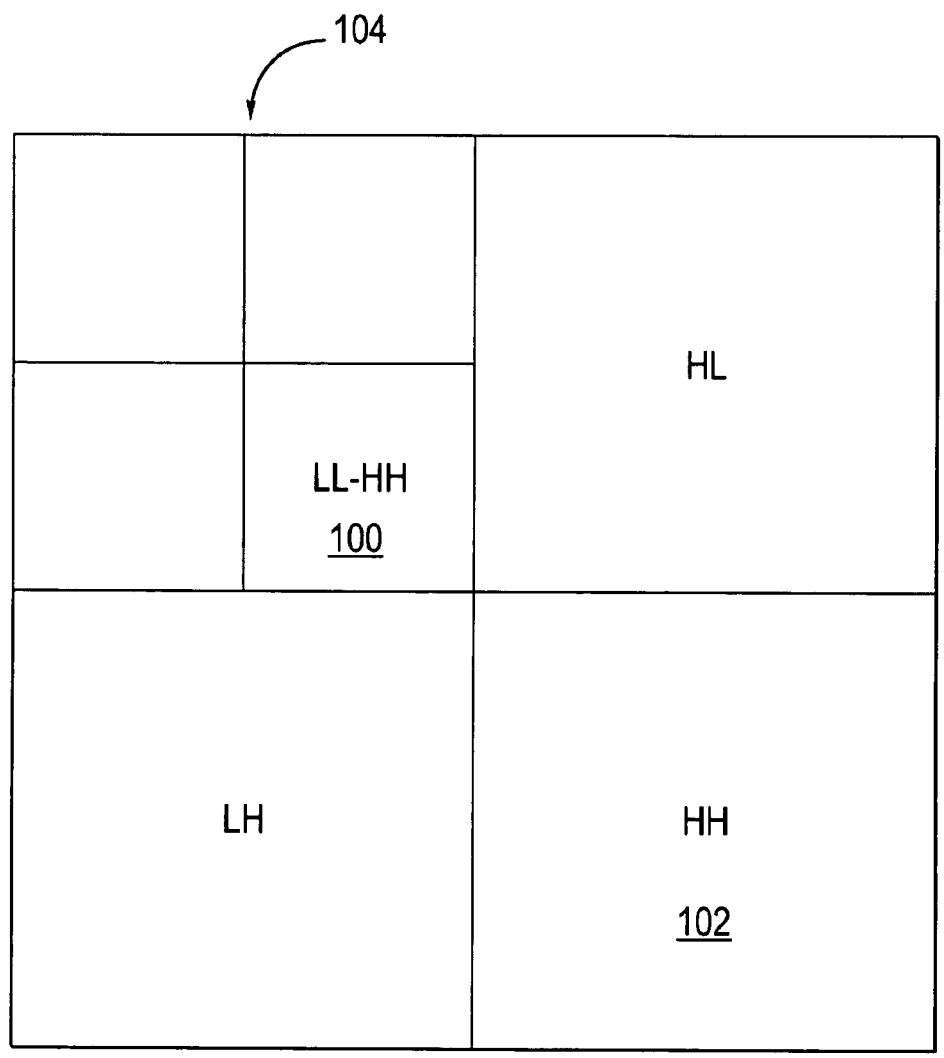
FIG. 7 shows exemplary wavelet subbands of a digital image.

In one exemplary embodiment, a LL-HH subband 100 (see FIG. 7 and the perceptual analysis module 41 of FIG. 2) of the wavelet transformed luminance data may be used to embed or host the audio data. In other embodiments, a high-frequency subband 102 may be used as it may provide a higher capacity and thus allow the embedding or hosting of a greater quantum or amount of audio data with less potential perceptual distortion of the host image signal or data 32 in the output embedded image 56. However, the high-frequency subband 102 may be vulnerable to lossy image compression that may be performed on the embedded image 56. A low-frequency subband 104 of the host image may also be used to embed the audio data but may introduce perceptual distortion and may have a lower capacity to hold the audio data 34 (less audio data may thus be hosted or embedded in the host image). Thus, in one embodiment, the LL-HH subband 100 is used as it may provide a reasonable balance between the high-frequency subband 102 with its potentially lossy image compression characteristics and the low-frequency subband 104 with its potentially low capacity for embedding audio data. In one particular embodiment, an increase in channel capacity of the order of about five times may be provided by including the audio data 34 in the HH subband 102 for a low JPEG compression setting.

Figure 4:
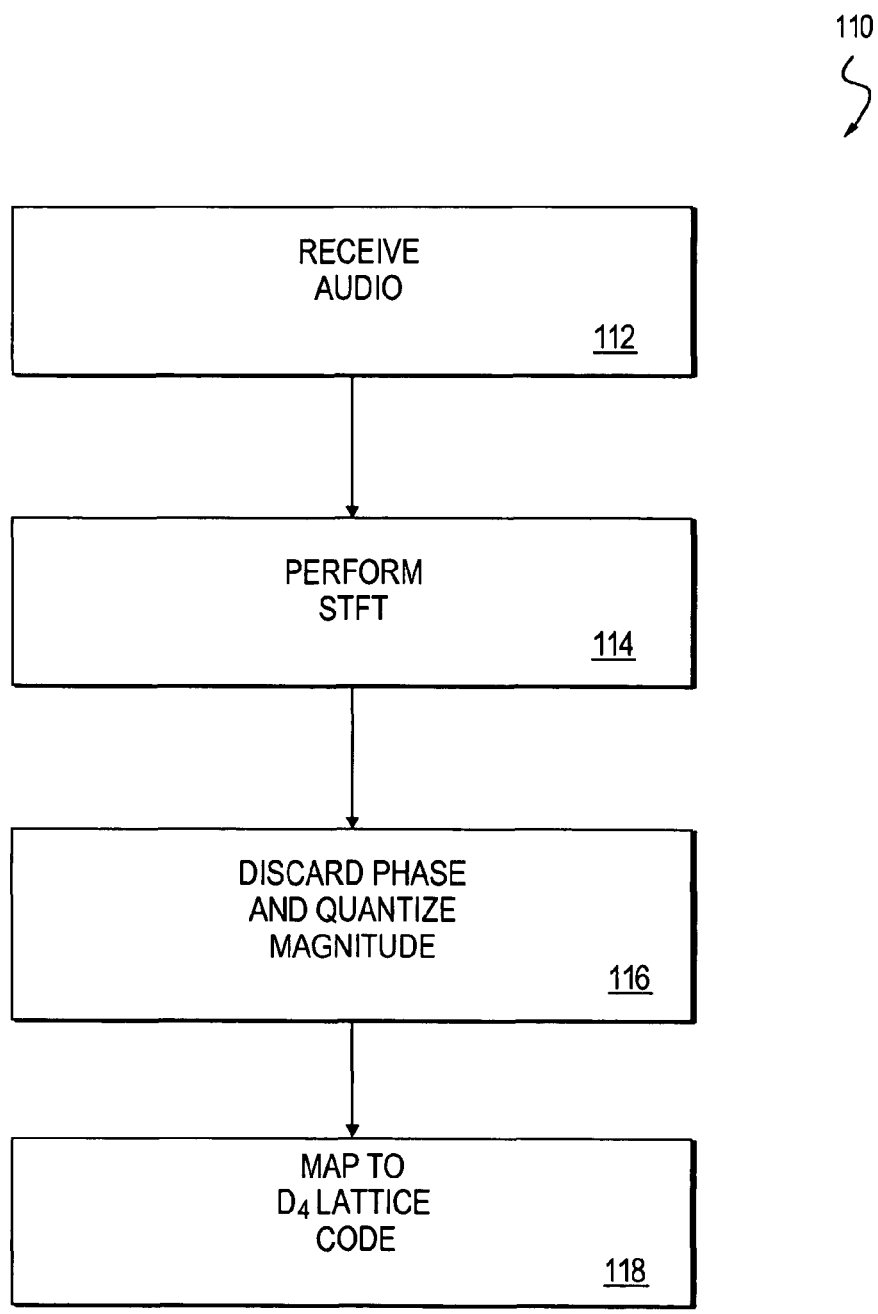
FIG. 4 shows a schematic flow diagram of a method, in accordance with the invention, to process audio data for embedding in a host image.

Reference numeral 110 (see FIG. 4) generally indicates an exemplary method, in accordance with the invention, to process audio data for embedding in a host image. In one embodiment, the method 110 is used to process the audio data 34 (see FIG. 2) in the host image data 32 of the system 30. As shown at operation 112, the method 110 may receive the audio data (e.g., representing any audio signal) which, for example, may be digital speech sampled at 8 kHz. Thereafter, as shown at operation 114, a Short-Term Fourier Transform (STFT) of the audio data is taken (see for example the STFT module 42 of FIG. 2), the phase of the transformed spectral data (STFT phase) may then be discarded, and the magnitude of the transformed spectral data (STFT magnitude) may be quantized (e.g., to 24 levels), as shown at operation 116. It will be appreciated that discarding the phase may degrade the audio reducing its quality but still provide sufficient information for subsequent reconstruction of the audio. Thereafter, the quantized magnitude may be mapped to a $D_4$ Lattice code (see operation 118). The output of the method 110 may provide 4-Dimensional (4D) channel coded audio data which, as described above, is combined with the perceptually adapted luminance subband data 82 to provide the perceptually adapted audio data 88.

In one exemplary embodiment, the method 110 when implemented on the system 30 receives audio data 34 in the form of 8-bit 8 kHz speech that is STFT transformed with a 50% overlap whereafter the phase is discarded. Each spectral magnitude may be quantized (e.g., uniformly) to 24 levels to match a first shell of a $D_4$ Lattice. The mapping may, in one embodiment, be done in such a way that a Lattice code when corrupted by additive noise, results in minimal error in the data it represents (the STFT magnitude). Accordingly, such a requirement may contribute toward a graceful degradation of the audio data embedded within the RGB host image or data 32. In one embodiment, adaptive coding may be used to analyze a region in the host image, and in response to the analysis decide on a code strength based on, for example, human visual sensitivity to frequency, luminance, and contrast masking. For example, greater distortion may be acceptable in high frequency or highly textured regions and, accordingly, a high code strength may be used for greater robustness, while retaining perceived transparency (reduced distortion of the host image under typical viewing conditions). In a bright low frequency region like a clear blue sky, low code strength may be used to improve transparency, but sacrifice robustness (modification of audio data after embedded image has undergone linear or non linear operations). In one embodiment, a simple scheme based on such frequency sensitivity may be used where the coefficient of a wavelet subband determines the frequency content of a region. Perceptual adaptation may be implemented by scaling a Lattice code based on the corresponding subband coefficient (see operation 76 in FIG. 3) that it replaces. For example, in the case of $D_4$ Lattice code, the scale factor may be derived as the maximum absolute of the four subband coefficients that it will replace.

For example, $$\text{Scale} = \max(|D_i|) \quad (1)$$

wherein, $0 \leq i \leq 3$, and $D_i$ are the four coefficients of a selected subband for replacement.

$$S = \text{Scale} * S_{global} \quad (2)$$

$$P = S_{min} \text{ if } S < S_{min}, S_{max} \text{ if } S > S_{max}, \text{ or } S \text{ in all other circumstances.} \quad (3)$$

$$D_i' = P * C_i, \quad (4)$$

wherein $D_i'$, is the new coefficient, $C_i$ is the Lattice code, $S_{global}$ is an overall scaling factor, $S_{min}$ and $S_{max}$ may limit the distortion. $D_i$ together with $S_{global}$ may determine the strength of the Lattice code S, and provide the perceptual analysis element. S may be larger for high frequency regions, which may better mask distortion.

In one embodiment, the $S_{min}$, $S_{max}$ and $S_{global}$ variables may be adjustable. $S_{min}$ may set a minimum distortion of the host image due to the embedded audio, and increasing $S_{min}$ may result in an overall greater robustness, but may increase image distortion. $S_{max}$ may limit a maximum distortion of the host image due to the embedded audio. In one exemplary implementation, $S_{global}$ may be set to 1.0, $S_{min}$ may equal 1.0 or 2.0, and $S_{max}$ may equal 4.0. At $S_{min}=1.0$, the distortion may be less noticeable. Although the invention is described by way of example with reference to lattice coding, it will be appreciated that in other embodiments binary coding (or any other appropriate technique) may be used. However, in certain circumstances, lattice coding may provide higher noise resistance.

Figure 5:
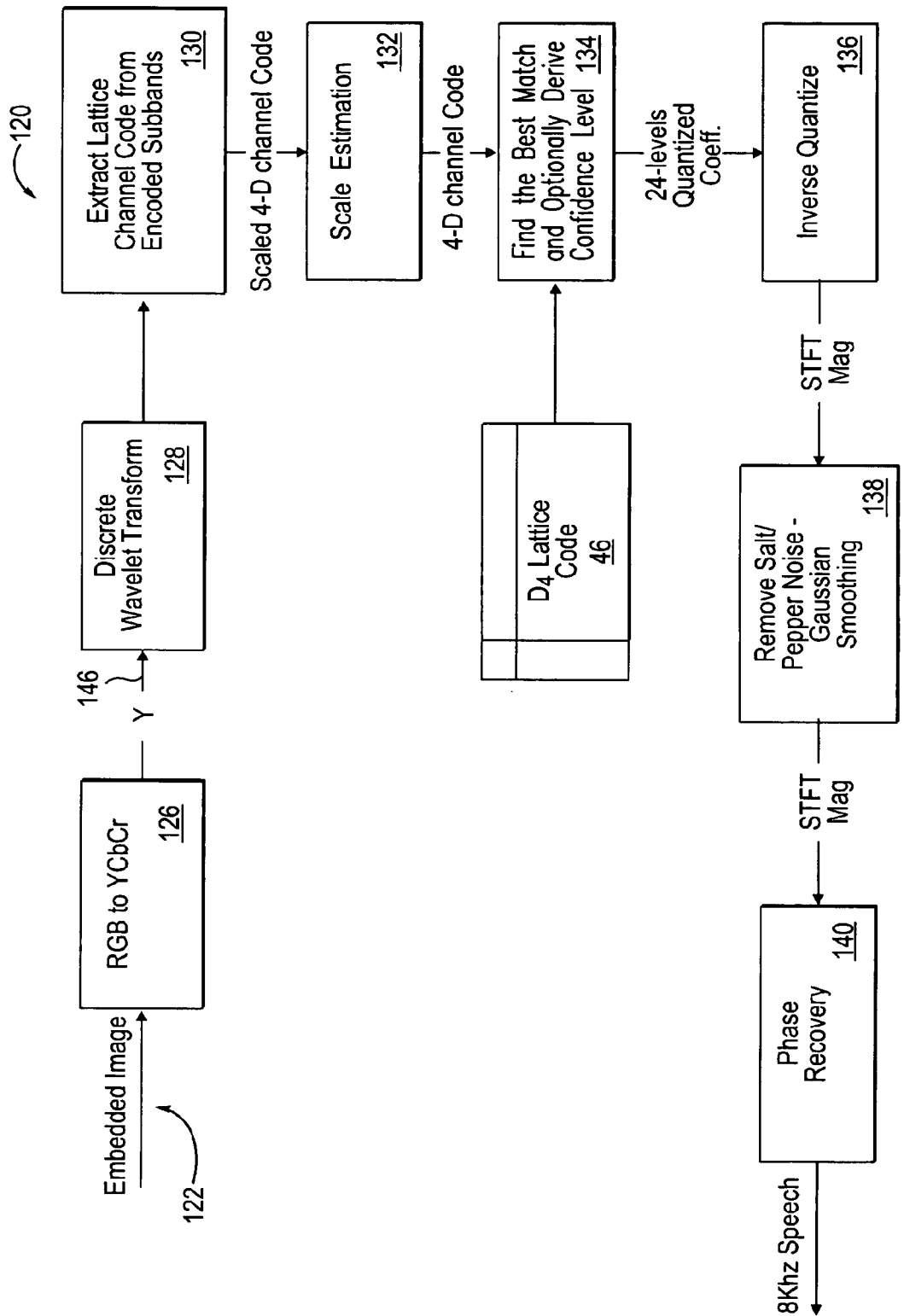
FIG. 5 shows a schematic block diagram of exemplary functional units of an embodiment of an audio processing system, in accordance with the invention, to extract audio from an embedded image.
Figure 6:
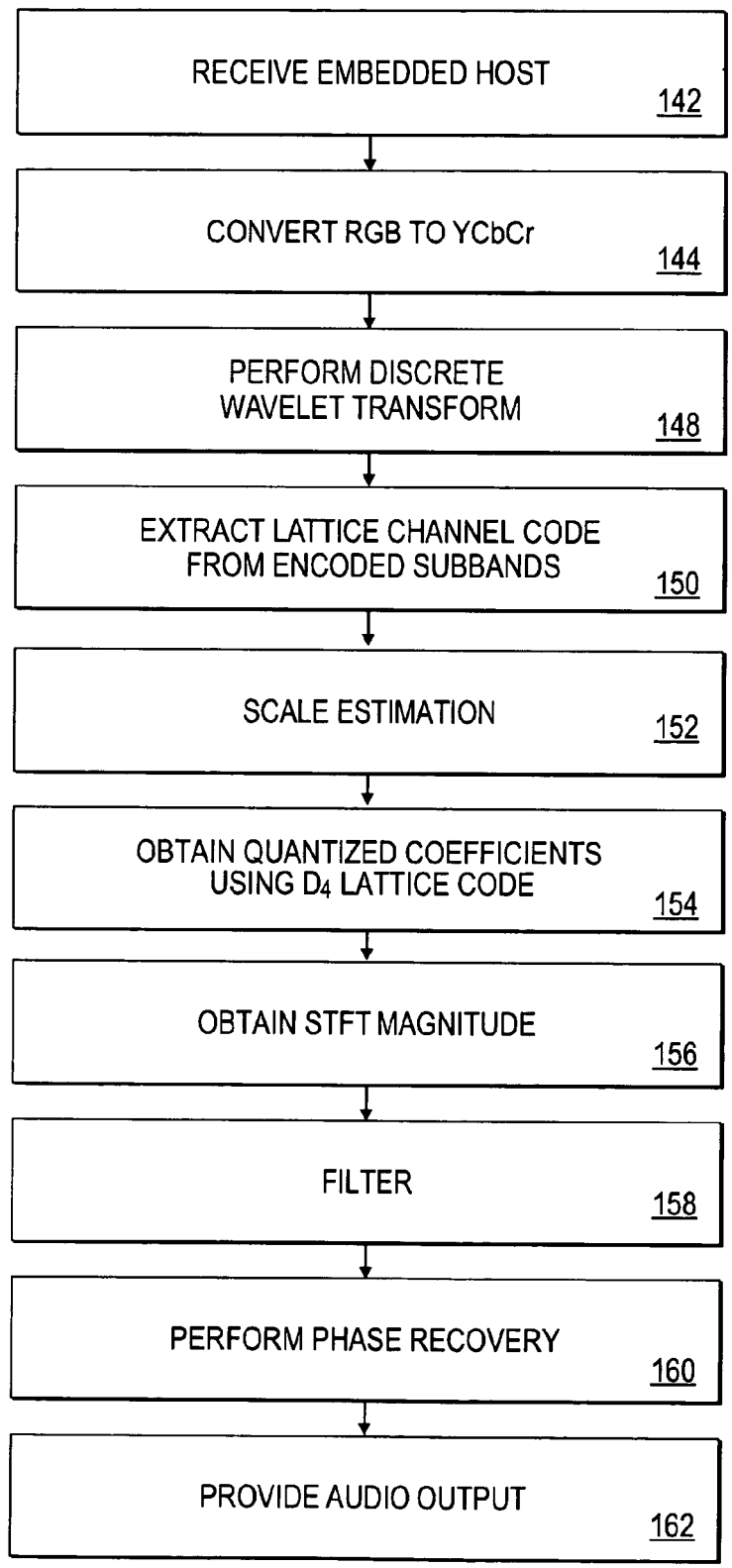
FIG. 6 shows a schematic flow diagram of an audio processing method, in accordance with the invention, to extract audio data from an embedded image.

Referring in particular to FIG. 5, reference numeral 120 generally indicates an exemplary system, in accordance with the invention, to process a digital image to retrieve or extract audio data from the digital image, for example an embedded host 122. The system 120 may, for example, be used to implement a method 124 (see FIG. 6). The system 120 includes an RGB to YCbCr conversion module 126, a discrete wavelet transform module 128, a Lattice code extraction module 130, a scale estimation module 132, a matching module 134, an inverse quantization module 136, a filter module 138, and a phase recovery module 140. As described in more detail below, the system 120 and the method 124 allow extraction of embedded audio data in the embedded image 122. Thus, for example, the audio data 34 (see FIG. 2) that is embedded in the RGB host image data 32 may be retrieved or reconstructed. The system 120 and the method 124 may, for example, also be included within the digital camera 10. However, in other embodiments, the system 120 and the method 124 may be provided in a PDA, a cellular telephone including a camera, or any other computing device (e.g., a PC) so that audio data embedded in images received by the device may be reproduced and the host image may be viewed. When the digital image is reproduced, a visual two-dimensional image (corresponding to the host image) may then be displayed to a user and, the accompanying audio data that was embedded in the image may be simultaneously played back or reproduced. Accordingly, the digital image including the embedded data may thus resemble a "talking photograph" or "talking picture." It will be appreciated that, as the audio data 34 is embedded within the host image data 32, a single entity or carrier medium is formed of the image data 32 and the audio data 34. Accordingly, two separate files are not communicated and the audio and visual data are merged or intermingled and copying of duplication of the image results copying or duplication of the audio data as well.

Returning to the system 120 and the method 124, as shown at operation 142 (see FIG. 6), the system 120 (FIG. 5) may receive the embedded image 122 (e.g., corresponding to the embedded image 56 of FIG. 2) and, thereafter (if necessary) convert RGB components to provide a YCbCr component as shown at operation 144 (see also the RGB to YCbCr conversion module 126). The luminance data, Y 146 is then fed into the discrete wavelet transform module 128 that performs a discrete wavelet transform (see operation 148) whereafter the Lattice code is extracted from the encoded subbands (see operation 150 and the extraction module 130). The output of the Lattice extraction module 130 may be a scaled 4-D channel code which then undergoes scale estimation at operation 152 (see also the scale estimation module 132) to produce a normalized 4-D channel code which is fed into the matching module 134 in order to find a best or appropriate match. The matching module 134 searches the Lattice code module 46 and, finding the best or appropriate match, produces quantized (e.g., 24-level) coefficients (see operation 154) which is inverse quantized (see the inverse quantize module 136) to obtain a STFT magnitude (see operation 156). The STFT magnitude is then filtered (see operation 158) to remove noise (e.g., salt/pepper noise) and Gaussian smoothing is performed (see filter module 138). The filtered STFT magnitude is then fed into the phase recovery module 140 to perform phase recovery (see operation 160) whereafter an output audio signal is provided at operation 162. The output audio signal corresponds to the audio data 34 (see FIG. 2) and may be considered, in one embodiment, as a recovered audio signal.

In one embodiment, the scale may be estimated as the largest absolute value of each coefficient because all first shell $D_4$ Lattice coefficient may have an maximum unit magnitude. Thus dynamic scaling may take place to allow codes of a different strength within the same host image without additional coding.

Figure 9:
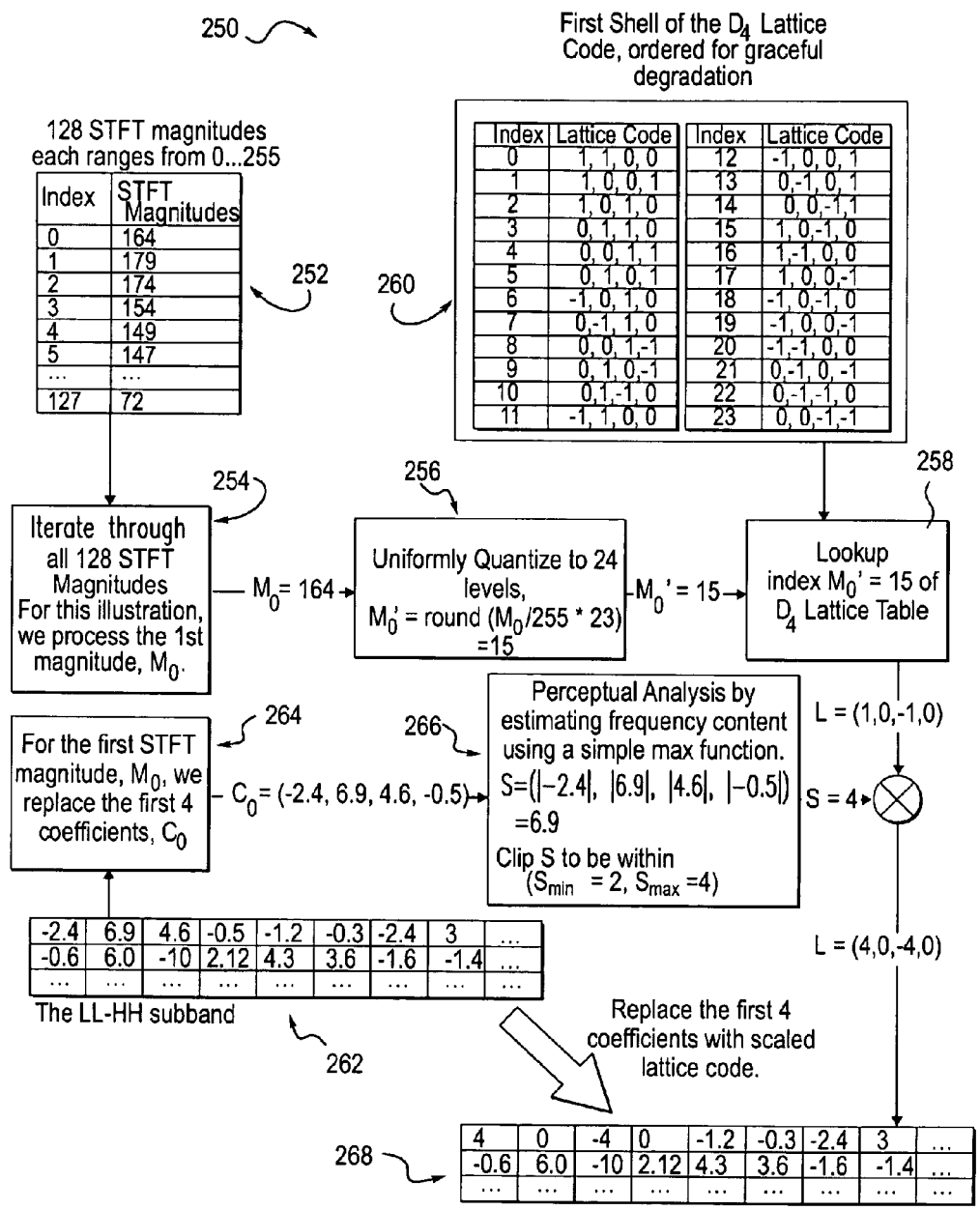
FIG. 9 shows an exemplary method, in accordance with the invention, of embedding a STFT magnitude into a subband of a host image.

As shown in FIG. 9, in one embodiment a two-level wavelet transform is preformed and a maximum of the four coefficients (which are replaced) of the LL-HH subband is used (e.g., directly) to scale the lattice code. Since the image already has undergone a wavelet transformation, the dynamic scaling operation may be fast and require only a few additional operations. By restricting the lattice code to the first shell of a $D_4$ lattice, the scale can be estimated during decoding and need not be transmitted with the embedded image.

In FIG. 9, reference numeral 250 generally indicates a method, in accordance with the invention, for mapping audio data to lattice codes. An advantage of lattice coding is that the distance between the lattice codes may be maximized to make it robust to noise. In one embodiment, the lattice code may ideally be scale large enough to handle the maximum noise of a channel. However, in the context of watermarking, this may not be practical because the noise model is hard to model in general. Even if the noise model is known, the scale may be too large; causing what may be unacceptable distortion. Thus in general, sufficient noise can still cause a lattice code to be decoded wrongly, and additional coding, like error detection and error correction, may be required to correct it, adding more computational overhead and complexity. However, in one embodiment of the invention, such errors may be allowed and not corrected. Instead, the wrongly decoded code may be provided near the actual code. In one embodiment, the mapping of the STFT magnitudes to the lattice code may be designed to meet this requirement. By way of example, the method 250 (see FIG. 9) shows exemplary mapping of audio data for the first shell of $D_4$ Lattice code. It will be appreciated that the mapping may be applied to all shells.

As shown at table 252, the STFT of the audio data (see the STFT module 42 of FIG. 2) may provide 128 STFT magnitudes each ranging, for example, from 0 to 255. Each STFT magnitude is then quantized to 24 levels (see operations 254 and 256). For example, using the first magnitude $M_0$ by way of example, assuming that the first STFT has a magnitude of 164 (see table 252) then as shown at operation 256 the quantized value may be given by:

$M_0'$=round ($M_0$/255 *23) (which in the given example equals 15)

Thereafter, as shown at operation 258, a corresponding $D_4$ Lattice Code is obtained from a First Shell of the $D_4$ Lattice table 260. In the given example the lattice code L equals (1, 0, −1, 0).

In the exemplary method 250, the LL-HH subband is used to embed the audio data. Accordingly, subband values of the host image in the LL-HH subband (see LL-HH subband table 262) are obtained. For example, as shown at operation 264, for the exemplary first STFT magnitude $M_0$, the first four coefficients Co (−2.4, 6.9, 4.6, and −0.5) may be obtained. Thereafter, as shown at operation 266 perceptual analysis may be performed by estimating the frequency content using, for example, a simple maximum function. For example, $S$=max (|−2.4|, |6.9|, |4.6|, |−0.5|1) which gives 6.9

The value may then be clipped to be within ($S_{min}$=2, $S_{max}$=4) and thus the value of 6.9 may be clipped to 4.

The resultant value ("4" in the present example) may then be multiplied by the lattice code L ((1, 0, −1, 0) in the given example) to provide a modified or scaled lattice code L' (which in the given example would be (4, 0, −4, 0)). These values may then replace the first four coefficients of the LL-HH subband (see table 268).

$D_4$ Lattice table 260 shows an example of a lattice code mapping for each STFT magnitude, however, in other embodiments other mappings are possible. It will be appreciated that there are 24! (Factorial) ways to order 24 lattice codes. Accordingly, in one embodiment of the invention, the Lattice codes are ordered. For example, the 24 lattice codes that are 24 points in 4-D space, may be ordered as follows:

1. For each lattice code $C_i$, (where i ranges from 0 to 23—see table 260), the following may be calculated
$D_i$=distance between a 4-D plane, containing $C_i$, with normal (N), to the origin (0, 0, 0, 0).
The choice of normal (N) may be arbitrary, but in one embodiment is chosen to minimize tie. For simplicity, N=(1, 1, 1, 1) may be chosen.
2. The lattice codes may then be sorted in descending order of $D_i$.
3. Lattice codes of the same $D_i$ may be permutated, for example, by exhaustively evaluating every possible ordering. K may be the number of codes of the same $D_i$. Since K may be small (e.g. 3), the number of combinations is K!<<24! An ordering may be chosen where the sum of Euclidean distance between two neighboring codes is minimal. It will be appreciated that the Lattice codes (e.g., in the Lattice code module 46 and the $D_4$ Lattice table 260) may be pre-generated. An encoder and decoder may have corresponding Lattice code tables and, in one exemplary embodiment, the Lattice code tables are published so that they are freely available. In one exemplary embodiment, during encoding, each quantized STFT magnitude maps directly to one Lattice code. As a noise corrupted normalized Lattice code may be received at the decoder, an entire Lattice code table may be searched for a matching entry (e.g., an entry with a minimum Euclidean distance).

The method 250 described above provides an exemplary method for mapping audio data to lattice codes. The extraction of the audio data from the embedded host may, for example, be achieved by performing at least some of the steps mentioned above in reverse. In one embodiment, the audio may be extracted as follows. Initially, the lattice code may be extracted from the host image. In one embodiment of the invention, the lattice codes including the audio data are freely available to the general public so that any person having appropriate hardware can decode the lattice codes. Accordingly, in one embodiment when the invention is applied in a digital camera such as the camera 10, the camera 10 may include both embedding functionality as well as extraction functionality. Once the lattice code has been extracted, a scale may be estimated. In one embodiment the first shell of the $D_4$ Lattice may only contain elements 0, 1, or −1, the estimation may therefore be relatively simple. For example, a maximum magnitude of the lattice code may be taken. In the example provided in FIG. 9, the scaled original lattice code L' (4, 0, −4, 0) may be corrupted by some noise and, for example, extracted as (3.2, −1.4, −4.5, 2.1). The maximum magnitude of the lattice code coefficient may then equal max (|3.2|, |−1.4|, |−4.5|, |2.1|)=3.2. Accordingly, the scale maybe chosen as 3.2. Thereafter, the lattice codes may be divided by maximum magnitude (3.2 in the given example), and a $D_4$ Lattice Code table (corresponding to the $D_4$ lattice code table 260) may be searched for the nearest code in Euclidean distance. If, for example, the maximum magnitude=0, which may occur when the extracted lattice code is (0, 0, 0, 0), the lattice code may be classified as unknown, and the corresponding STFT magnitude is set to zero.

In certain embodiments, post-processing may be performed to improve the quality of the STFT magnitudes extracted. For example, salt and pepper noise may be removed. Assuming that, for example, a pixel represents the STFT magnitude then for each pixel, the average pixel value of a 5×5 window can be calculated. If the pixel value differs from the average pixel value by 32, then the pixel value may be set to the average value. As described in more details below, an alternative post-processing method may utilize Pull-Push functionality to remove salt and pepper noise, which may be applicable to both discrete wavelet transforms and discrete cosine transforms. The Pull-Push functionality is described in Gortler S. J, Grzeszczuk R, Szeliski R., Cohen M. F., "The Lumigraph", Computer Graphics, Annual Conference Series, 1996, the contents of which is incorporated herein by reference. In certain circumstances, the two methods described above may perform poorly if the noise clusters together resulting in large gaps. For example, all the lattice code in the sky region in FIG. 14A may be badly corrupted, losing an entire portion of the audio. One solution is to shuffle the STFT magnitude prior to encoding. This has the effect of spreading the error. The receiver can undo the shuffling after the noise reduction. In one embodiment, an additional Gaussian smoothing may be provided by using a standard Gaussian Kernel with a 3×3 window and standard deviation=1.

In one embodiment, the embedded audio data 32 is not encrypted or encoded and thus a user is not inhibited from extracting the audio data. The user may thus freely extract the audio data. Also, unlike watermarking and data hiding where the data included in the host data is hidden or concealed in order to prevent a user from extracting the data, in one embodiment of the invention, the audio data 34 embedded in the host image 34 in a known portion of the image and may be freely extracted without knowledge of encryption keys or any other secret information. For example, in watermarking, multimedia distributors generally attempt uniquely to identify their digital content so that, in the event of any unauthorized distribution, they may identify the source of the unauthorized distribution. A digital watermark is a digital signal or pattern inserted into a digital image that merely identifies the specific image and relatively little data is included in order to do so. Digital watermarking differs from encryption in that it leaves the original image intact and recognizable. Encryption is also used by multimedia distributors in order to prevent unauthorized duplication of the media. Digital content distributors also use data hiding to include data that can only be retrieved by a person if he or she is authorized to do so. Data hiding, as opposed to digital watermarks, allow larger amounts of data to be hidden but both techniques aim at preventing a user from extracting the hidden data from the host. However, in one embodiment of the present invention, the audio data is freely extractable by any person and extraction not restricted in any way. Accordingly, photographs taken with the camera 10 may, for example, be sent to family and/or friends who upon viewing the photograph may have the audio played back to them. Thus, for example, the embedded audio may include a greeting, message, or the like that accompanies a still image thus providing a "talking photograph".

In certain embodiments, a magnitude and a phase of the STFT may be embedded in the host image but the audio data may then require twice as much bandwidth or embedded area as would be required to embed the magnitude only of the audio data in the host image 32 (e.g., assuming a 50% overlap). Accordingly, in one exemplary embodiment the phase is discarded and the magnitude only is embedded in the host image. Thus the quantum of audio data (the total number of bits) included in the host image may be reduced. Although the actual quality of the audio may then also be reduced, a longer playing time of the audio may be provided for a given amount of embedded audio data (e.g., a longer message may be embedded in the host image).

An exemplary method and system to recover the phase (or an estimated phase) from the STFT magnitude (which may be implemented by the phase recovery module 140—see FIG. 5) is set out below. It will, however, be appreciated that the invention need not be limited to the exemplary embodiment set out below and that any technique for recovering phase from a STFT magnitude signal may be used in different embodiments.

Figure 8:
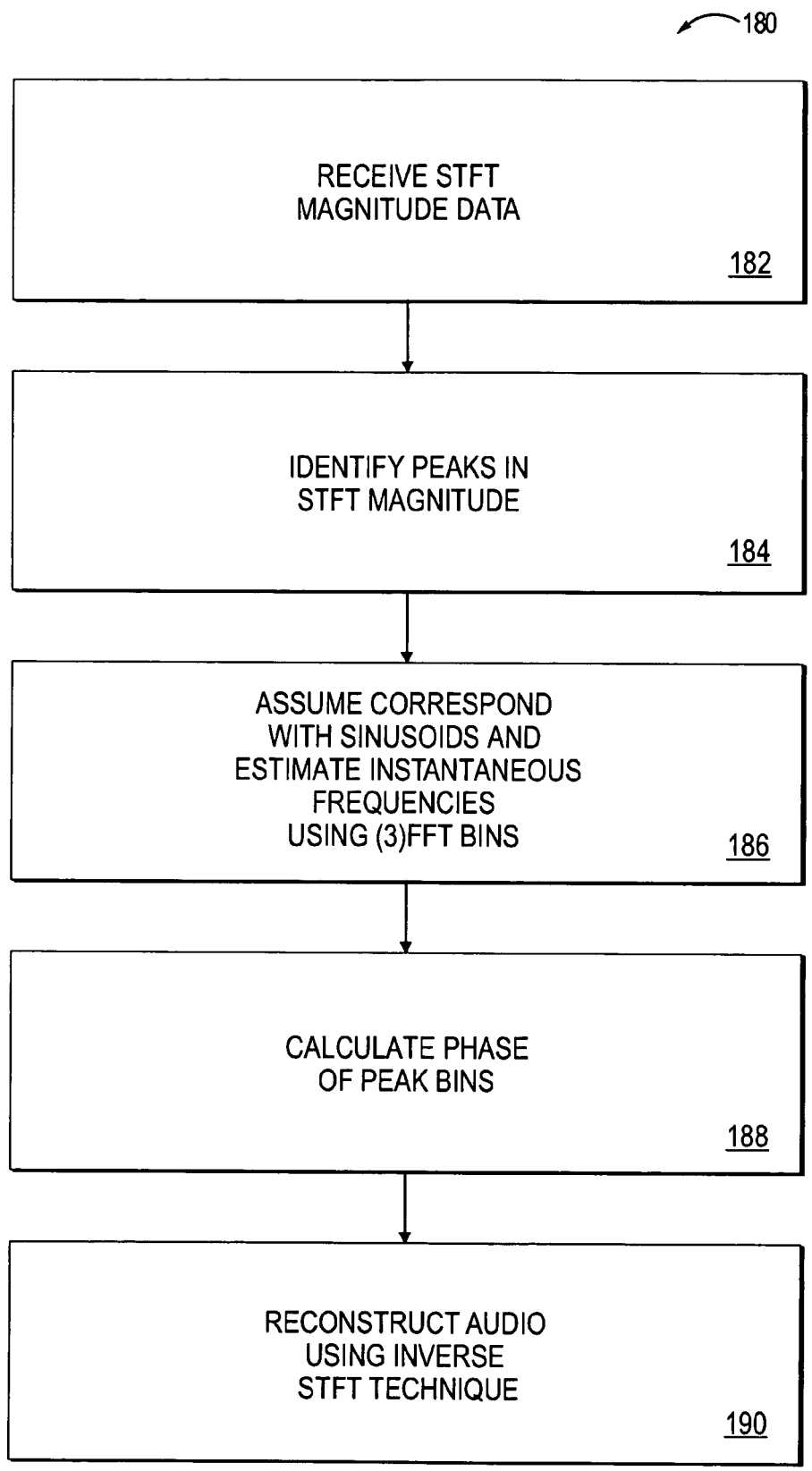
FIG. 8 shows a schematic flow diagram of an audio processing method, in accordance with the invention, to reconstruct audio data from magnitude data derived from an original audio signal.

Referring to FIG. 8, reference numeral 180 generally indicates a method, in accordance with the invention, for reconstructing an audio signal from audio data embedded in a host image. The method 180 may be a non-iterative reconstruction technique that may be used in real-time applications or in situations where computational resources are scarce or it is desirous to limit such computations. It will be appreciated that the invention is not limited to this exemplary reconstruction technique.

As shown at operation 182, the method 180 receives STFT magnitude data and, thereafter, identifies peaks in the STFT magnitudes (see operation 184). The peaks in the STFT magnitude are assumed to correspond to sinusoids in the signal and, as shown at operation 186, the method 180 estimates the instantaneous frequency of each sinusoid (peak) by fitting a parabola to FFT bins (e.g., three FFT bins) that may surround each peak. It will be appreciated that more or less than 3 bins may be used. The method 180 then finds a frequency (or approximate frequency) at which the parabola is at its maximum (or approximately its maximum). The method 180 then calculates or estimates the phase of the peak bins (see operation 188) using the phases at a previous frame, and a phase increment calculated from an instantaneous frequency. Thereafter, as shown at operation 190, the audio signal is reconstructed from the STFT magnitudes using an inverse STFT technique, e.g., a standard STFT technique.

In certain embodiments, any algorithm can be used to identify the sinusoidal peaks in the spectrum. For example, a check may be conducted to see if a bin magnitude is larger than its two neighbors on the left of the peak and its two neighbors on the right of the peak. In another embodiment, enhanced results may be provided when the analysis takes into account that side lobes are not mistakenly identified as sinusoidal peaks. In yet another embodiment, a check may be conducted that the shape of a peak has indeed matched what can be expected to be a true sinusoid.

Once the instantaneous frequency ω has been calculated (see operation 186) for a given peak, a new phase $\phi_k$ at frame k may be obtained as follows:

$$\phi_k = \phi_{k-1} + 2\pi\omega R, \quad (5)$$

where R is a hop size in samples, and ω is the normalized frequency.

The phase may then be applied to the FFT bins surrounding the peak bin. The process may be repeated for each individual peak. In one embodiment, arbitrary initial phases can be used for $\phi_o$ in the absence of any a-priori knowledge. The inverse FFT may generate a short-term signal with a maximum near n=0. Under these circumstances, the same phases may be assigned to the bins around the peaks, and accordingly the FFT is "zero-phase" in which a signal may be centered at n=0. The final output short-term signal may be obtained by circularly shifting the output of the FFT by half the window-size.

The method 180 may, in certain circumstances, render a reasonable approximation or reconstruction of the audio data. However, in other embodiments, it will be appreciated that various other reconstruction techniques may be used to provide enhanced reconstruction of audio signals. In one embodiment, the method 180 may include a series of Griffin-Lim iterations.

Thus, in one embodiment, the audio data may be assumed to comprise a plurality of sinusoids and the STFT phases around the peaks are updated according to an estimate of the sinusoids instantaneous frequencies.

In one embodiment of the invention, as described above by way of example, the data processing system 30 and/or the data processing system 120 may be included in a portable digital camera. Accordingly, users of the digital camera such as the general public may record audio clips or messages simultaneously with the taking of a still picture where the audio clip is then embedded within a host image which may then be stored on the digital camera or communicated via, for example, a cellular telephone network. Any device receiving the digital image may then retrieve or extract the audio data from the digital image and, for example, when viewing the digital image the audio data may be automatically generated or reproduced. Accordingly, in one embodiment as mentioned above, the invention provides a "talking photograph" or "talking picture" wherein the audio data and image data are integrated.

In one embodiment of the invention, the embedded audio data may at least partially survive lossy format conversions, for example, conversion from a BMP format to a TIFF format, a BMP format to a Targa format, or the like. In one embodiment, the digital audio (e.g., digital speech) may survive lossy of compression (e.g., JPEG compression) with graceful degradation at higher compression ratios. Further, in certain embodiments, common image processing routines like sharpening, color balancing, gamma, brightness and contrast adjustment, and 90° rotation may also not substantially degrade the audio data.

In one embodiment of the invention, the embedded audio data is embedded as transparent as possible so as to reduce alteration of the original still image (host image). However, unlike digital watermarks and digital hiding, in one embodiment of the invention, the audio data embedded in the still image is intended to be freely retrievable or recoverable by any person using a compatible device. As the audio data is intended to be freely recoverable, recovery techniques are not kept secret and may be published and no encryption keys or the like may be required to retrieve the audio data.

In the exemplary embodiment described above, a discrete wavelet transform (DWT) is performed on the luminance channels or component 68 (see the discrete wavelet transform module 38 in FIG. 2). In another exemplary embodiment, a discrete cosine transform (DCT) is used.

Figure 10:
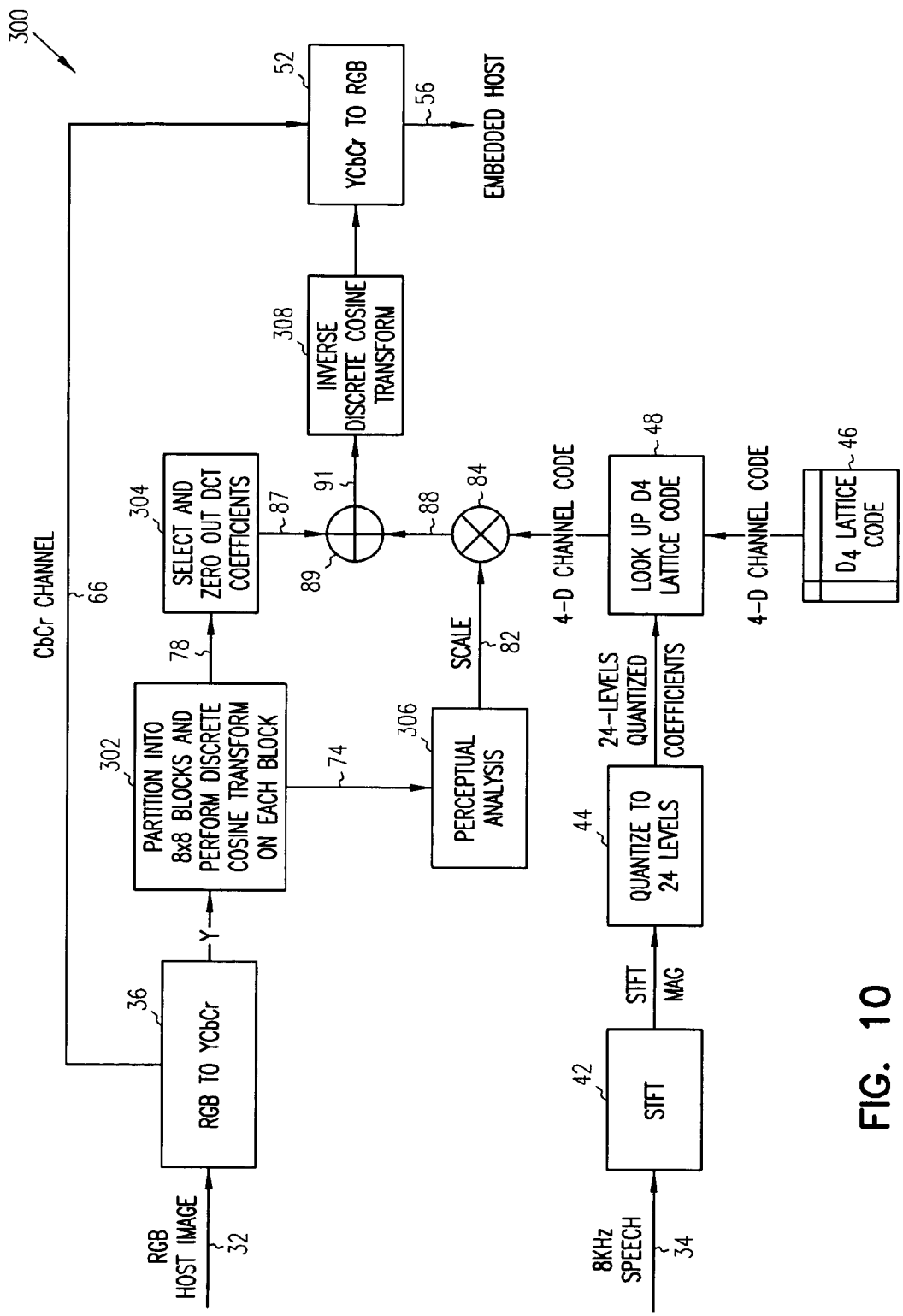
FIG. 10 shows a schematic block diagram of exemplary functional units of a further embodiment of an image processing system, in accordance with the invention, for processing a digital image.

Referring to FIG. 10 of the drawings, reference numeral 300 generally indicates an exemplary system, in accordance with an embodiment of the invention, to process an image to embed audio data therein. The system 300 resembles the system 30 and, accordingly, like reference numerals have been used to show the same or similar features. However, the discrete wavelet transform module 38, the filter module 40, and the perceptual analysis module 41 of the system 30 are replaced in the system 300 with a discrete cosine transform module 302, a DCT filter module 304, a DCT perceptual analysis module 306, and an inverse discrete cosine transform module 308. As in the case of the system 30, the system 300 may be used in conjunction with, or integrated within, any electronic device providing digital camera technology. When the system 300 is included with the digital camera 10, data may be compressed using the JPEG format.

In the system 300, the images are first partitioned into exemplary 8×8 blocks in the discrete cosine transform module 302. This partitioning may be performed during image compression using, for example, JPEG technology or MPEG technology. Thereafter, the exemplary 8×8 blocks are transformed using a direct cosine transform to produce another 8×8 block of DCT coefficients that provide intermediate luminance data 78 to the DCT filter module 304. In one exemplary embodiment, a group of coefficients is selected (e.g., pre-selected) corresponding to a mid-band. The selected coefficients are then filtered (e.g., zeroed out) by the DCT filter module 304 to provide filtered luminance data 87. The discrete cosine transform module 302 also provides intermediate luminance data 74 to the DCT perceptual analysis module 306 to provide perceptually adapted luminance data 82 that is combined with the lattice codes of the audio data from the look-up module 48 as shown at 84. Perceptually adapted audio data 88 then replaces the selected coefficients as shown at 89 to provide modified luminance data 91 that is fed into the inverse discrete cosine transform module 308. The inverse transformed data is then fed into the YCbCr to RGB conversion module 52 where it is processed as described above with reference to FIG. 2.

Thus, in the system 300 the discrete wavelet transform processing of the system 30 has been replaced with discrete cosine transform processing. In a similar fashion, the method 60 of FIG. 3 may have operations 72, 76, and 80 modified to perform discrete cosine transform processing instead of discrete waveform transform processing. In the exemplary system 300, the audio (e.g., speech) is transformed using a STFT prior to mapping to the lattice codes which may thus provide graceful audio degradation.

Figure 11:
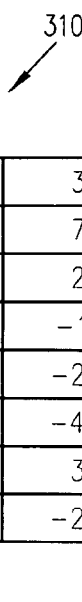
FIG. 11 shows an exemplary 8×8 discrete cosine transform (DCT) coefficient block with four DCT coefficients that are replaced by a lattice code.

Referring to FIG. 11, reference numeral 310 shows an exemplary 8×8 Discrete Cosine Transform (DCT) coefficient block with four DCT coefficients 312, 314, 316, and 318 that are replaced by lattice codes from the look-up module 48. In one exemplary embodiment, each lattice code replaces four coefficients and only one STFT magnitude is encoded per 8×8 coefficient block 310. As in the case with the discrete wavelet coefficients (see FIG. 9) the audio storage capacity of the host image may be increased by selecting more coefficients (e.g., high-frequency coefficients) which may result in a decrease of robustness. For example, in a digital camera (e.g., the digital camera 10) where a user has selected a high-quality image, the camera may store digital image of pictures taken with minimal JPEG compression and, due to the minimal JPEG compression, higher frequency DCT coefficients may not be adversely affected. Thus, in one exemplary embodiment, these high-frequency coefficients can be used for lattice coding thereby to enhance the capacity of the digital image to accommodate audio data. In one exemplary embodiment, in a similar fashion to the Discrete Wavelet Transform case, for perceptual analysis 306, the scale may be taken as the maximum absolute of the four DCT coefficients which will be replaced. For example, in FIG. 11, Scale $S=\max(|-15|, |-12|, |-17|, |0|)=17$.

Figure 12:
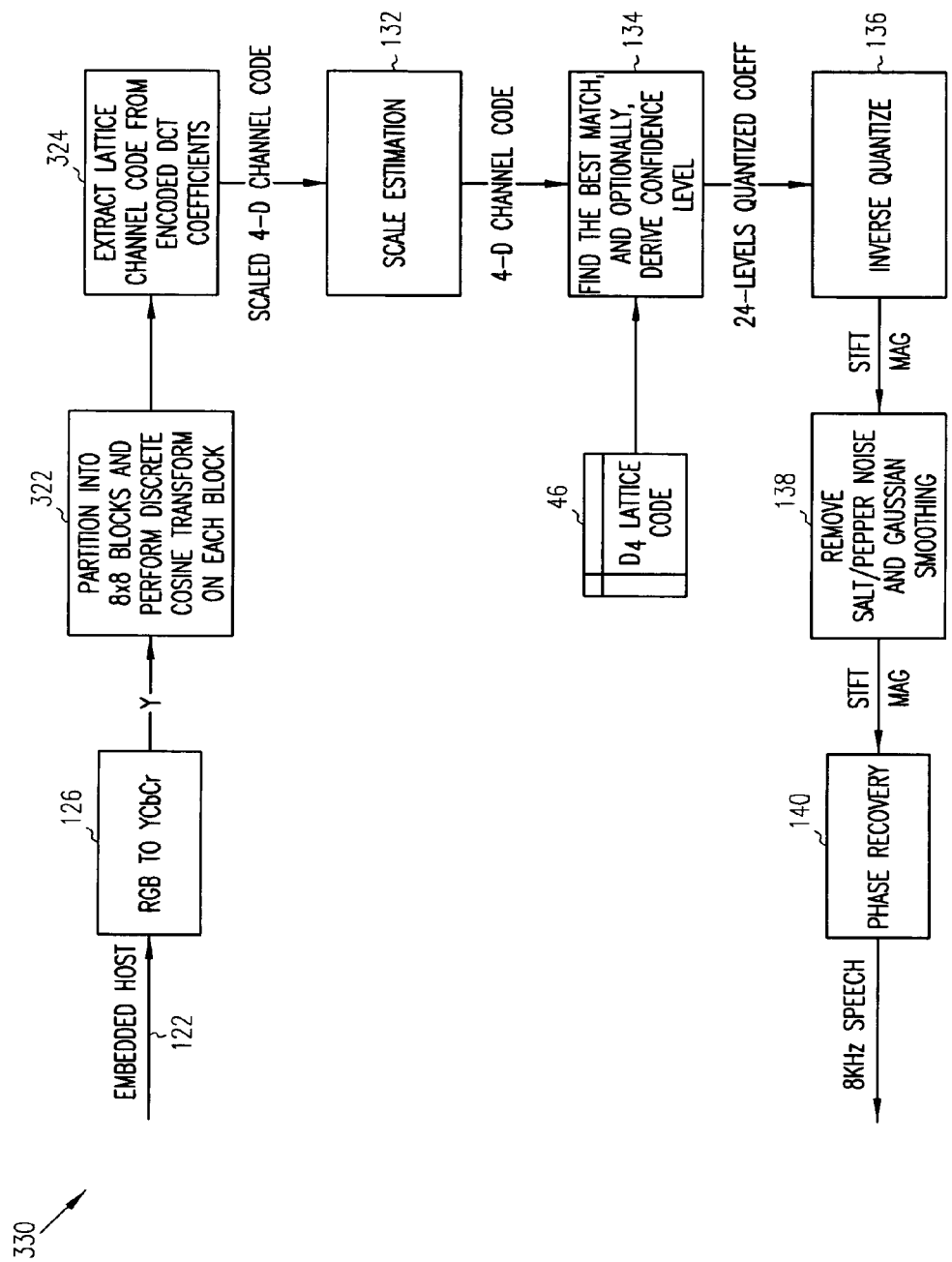
FIG. 12 shows a schematic block diagram of functional units of another exemplary embodiment of an audio processing system, in accordance with the invention, to extract audio from an embedded image.

Reference numeral 320 in FIG. 12 generally indicates a further embodiment of an audio processing system, in accordance with the invention, to extract audio from an embedded image. The system 320 is substantially similar to the system 120 and, accordingly, like reference numerals have been used to indicate the same or similar features. In the system 320, a discrete cosine transform module 322 and a lattice extraction module 324 replace the discrete wavelet transform module 128 and the lattice code extraction module 130 of FIG. 5. The discrete cosine transform module 322 partitions the luminance data 146 (YCbCr component) into exemplary 8×8 blocks and performs a discrete cosine transform on each block. The lattice extraction module 324 then extracts the lattice channel code from the encoded DCT coefficients to provide a scaled 4-D channel code that is fed into the scale estimation module 132, as described above with reference to FIG. 5 in the discrete wavelet transform embodiment. In a similar fashion, the method 124 (see FIG. 6) may be modified in operations 148 and 150 to perform discrete cosine transform processing.

In one exemplary embodiment, reconstruction of corrupted STFT magnitudes can be modeled as a two-dimensional scattered data approximation in the filter module 138. Resulting gaps may, for example, be filled by a Pull-Push method such as that proposed by Gortler S. J, Grzeszczuk R, Szeliski R., Cohen M. F., "The Lumigraph", Computer Graphics, Annual Conference Series, 1996, the contents of which is incorporated herein by reference. An input to this Pull-Push method is a set of known values, and their corresponding weights. The weights measure a level of confidence in the known values, where a zero weight indicates an unknown value. Applying the Pull-Push method to the systems 30, 300, the extracted STFT magnitudes may be regarded as known values, and their weights may be modeled as a function of the distance between extracted noisy lattice codes and their nearest (matched) lattice code. A zero distance (e.g., perfect match) may indicate a maximum weight. Applying these exemplary techniques:

$$w=1-d, \tag{6}$$

where w is weight and w=0 denotes a level of lowest confidence, and d is the Euclidean distance between the extracted noisy lattice code and its closest match:

$$d=\sqrt{(C_1-M_1)^2+(C_2-M_2)^2+(C_3-M_3)^2+(C_4-M_4)^2}, \text{ where} \tag{7}$$

the extracted Lattice code, $C=(C_1, C_2, C_3, C_4)$, and
the closest matching Lattice code, $M=(M_1, M_2, M_3, M_4)$.

In one exemplary embodiment, instead of using an entire, or substantially entire, host image for embedding the audio data, a mask may be used to limit the portion or area of the host image in which the audio data is to be embedded. Exemplary mask 330 (see FIG. 13B) is elliptical in outline and any portion of an exemplary image 332 (see FIG. 13A) within the ellipse may be reserved (e.g., reserved exclusively) for image data. Thus, an area 334 external to the ellipse may be used to embed the audio data. It will be appreciated that the shape and/or size of the mask may differ from one embodiment to the next and may also differ dependent upon that nature of the picture captured by the host image. FIG. 14A shows a further exemplary embodiment of a mask 336 for masking an area of a host image 338 (see FIG. 14B) in which only image data is to be provided. In the mask 336, audio data is embedded in the area 340 only. It will be appreciated that any number of masks of any appropriate shape and/or size may be provided. Thus, audio data may be embedded in any portion or embedded in the entire host image.

In one exemplary embodiment, the masks 330, 336 may be binary or discrete in nature (e.g., a "1" corresponding to an area including audio data, and "0" corresponding to an area excluding audio data). Thus for example, the mask 330, 336 may define an area which exclusively includes image data to the exclusion of audio data and host pixels with a zero mask value may be left untouched (the original image data remaining unchanged). However, it will be appreciated that the exemplary masks 330, 336 may be continuous in nature (e.g., a value between "0" and "1" to indicate how strong or heavily the embedding of the audio data should be in a given area). Thus, masking may allow a user (or electronic circuitry) to choose a region where distortion in the host image is tolerable and embed the audio data therein and preserve an important region or area of the host image. Further, the audio data may be embedded in both a masked portion and an unmasked portion where more audio data is stored per pixel in the unmasked portion than in the masked portion. The "density" of the stored audio data may thus vary from image portion to image portion in the embedded image.

The mask may be user-defined or a user may select one of several predetermined masks. For a user-defined mask, the exemplary systems 120, 320 (see FIGS. 5 and 12) that process the embedded image to retrieve or extract audio data from the digital image, include a corresponding mask which is then used in the extraction process. For example, when a predetermined mask is used in the generation of the embedded image 56, the systems 120, 320 identify which predetermined mask was used during the embedding process, and a corresponding predetermined mask is then used to extract the audio from the embedded image. For example, the associated mask may be identified by an external input (e.g., user selection), the receiver can exhaustively try out all the predetermined masks and use the one with the highest confidence factor, or any other identification means may be used to identify the mask used (e.g., an identifier may be embedded in the host image, a tag may be provided, or any other identifier). In one embodiment, the confidence factor may be determined using equation (7).

It will be appreciated that embedding the audio data in the host image may result in image distortion. The amount of image distortion is dependent upon the amount or quantum of audio data embedded in the host image. However, the amount of distortion may be reduced by adaptively controlling the lattice code scale as described above. In addition or instead, masking may be used to control and area of the embedded image where distortion occurs due to the embedding of audio data. However, it will be appreciated that various other techniques may, in addition or instead, be used to reduce distortion of the host image.

The embedded images may, for example, be viewed on a display device (e.g., a computer monitor, a television set, a PDA display, a digital camera, display, a cellular telephone display, or the like), or be printed. A relatively high resolution image (e.g. a 5 Megapixel image) when viewed in its entirety (e.g., without zooming) on a 1280×1024 pixel monitor may be down sampled. This down sampling process is generally low-pass filtering which may thus effectively remove any distortion introduced as a result of the audio data being embedded in the host image. As a result, the user may not see the distortion. In certain printing scenarios, the distortion may be hardly visible as a result of the dot gain and the dithering process of the printer which smoothen out the distortion.

In one exemplary embodiment, a viewer application, which is aware of the embedding using the discrete cosine transform technique described herein, may remove the embedded audio data by performing a forward discrete cosine transform, filter out (e.g., zero out) the selected coefficients, and process the embedded host image with an inverse discrete cosine transform prior to displaying the image. It will be appreciated that the same methodology may be used with the discrete wavelet transform by substituting the discrete cosine transform with discrete wavelet transform in the methodology. In another exemplary embodiment, the lattice scale may be matched to noise associated with the image such as camera or sensor noise introduced during an image capture process. The noise may be measured or estimated from data in Exchangeable Image File Format (EXIF header). For example, an image captured using a digital camera may contain some level of noise arising from the lens and/or sensor. At a higher ISO level, this noise can be very apparent. For example, in traditional analog film camera, the cameraman may select a high ISO level film which is more sensitive to light but results in more "grains". In a digital camera, a high ISO level corresponds to high sensor (CCD or CMOS) gain, which results in greater noise in the original image. Since the original image already contains some noise, an attempt may be made to limit the distortion (which looks like noise) caused by watermarking to the same degree as the sensor noise, thus hiding it among the sensor noise. The lattice scale may be chosen such that the distortion caused by embedding the scaled lattice code does not exceed the distortion caused by sensor noise. The lattice code may thus effectively be hidden in the noise. In another exemplary embodiment of the invention, the audio data may be included in an EXIF file, for example, in an EXIF header and, accordingly, the audio data may survive file format conversion better. In another exemplary embodiment, the STFT magnitudes may be pasted directly (e.g., not hidden) on to the image, for example, during creation of the image. In one exemplary embodiment, the speech or sound strip may be generated during encoding utilizing similar operations to those provided in operations 112, 114 and 116 of the method 110 (see FIG. 4). In one exemplary embodiment, the magnitude may be quantized to 256 levels instead of 24 levels as a gray image typically has 256 levels. It will however be appreciated that the magnitude can be quantized to any number of levels.

Figure 15:
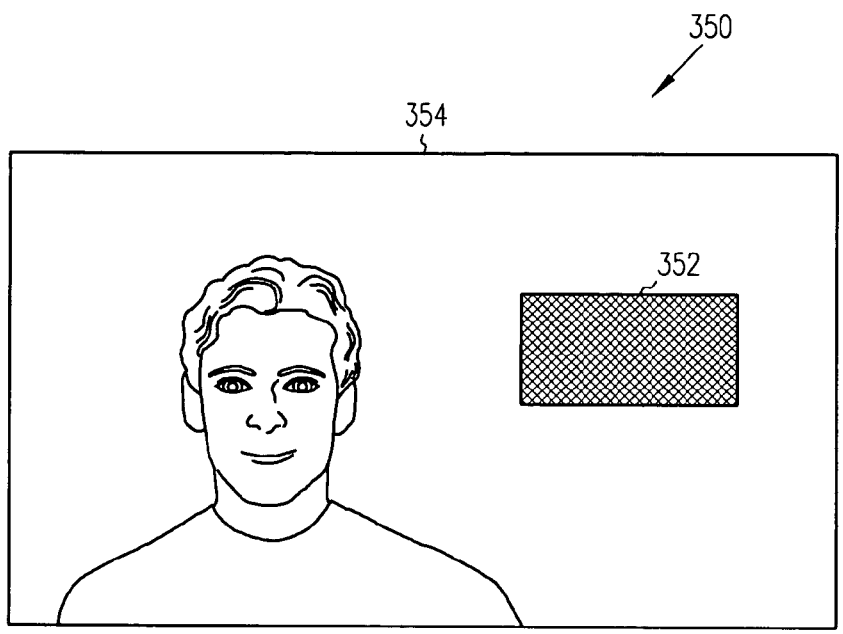
FIGS. 15 and 16 show exemplary screen displays of images and their associated audio represented as a "sound strip" or "speech strip"

Referring to FIG. 15 of the drawings, reference numeral 350 generally indicates an embedded host image where the audio data is provided in a selected region 352 of the host image 354. The audio data may be provided in a "speech strip" or "audio strip" that includes STFT magnitudes generated from the audio data as described above with reference to FIG. 2. In one embodiment, the speech strip provides STFT magnitudes that are rendered as a regular grayscale image. It will be appreciated that the speech strip may be extracted from the embedded image and then displayed in the selected region 352.

Figure 16:
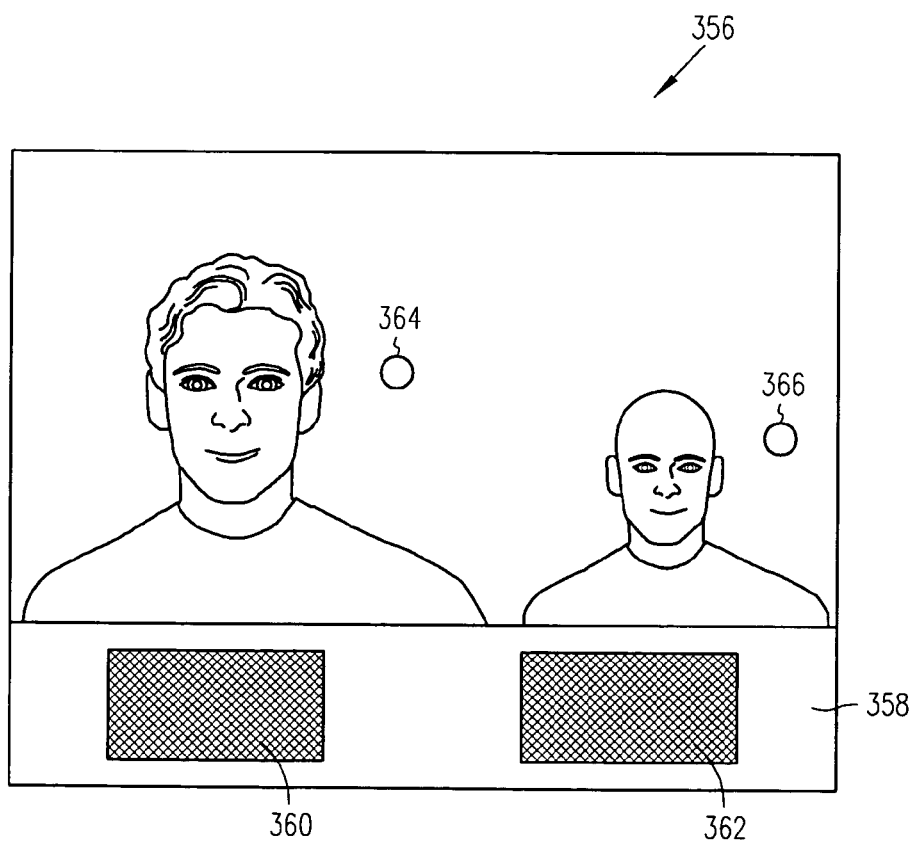

In one exemplary embodiment, the speech or audio strip is overlaid or "pasted" (e.g., directly) on to the host image. This may allow a user to edit the speech strip, for example, using cut and paste functionality, and mix two or more speech or audio strips. As the speech or audio strip is part of the image, it may survive various image processing techniques, image format conversion, and digital-analog-digital conversion. In the exemplary embodiment shown in FIG. 16, an embedded host image has an extended portion 358 to accommodate the audio data (e.g., provided in speech or audio strips 360, 362). However, the spatial relation with the speaker (image of one person captured in a photograph) may be lost for the case of more than one speaker (image of another person captured in the photograph). In one embodiment, markers 364, 366 may be provided each to act as an index to a corresponding speech strip 360, 362 respectively. An electronic device (e.g., any digital processing device) may detect and decode the markers 364, 366 and the speech strips 360, 362. For example, when a user moves a pointer (e.g., a pointer of a mouse) to one of the markers 364, 366, the speech or audio corresponding to the identified marker can be reproduced from its associated speech strip.

In the exemplary embodiments described above, lattice coding is used when embedding the audio data into the host image. However, other techniques are used in other embodiments. For example, a Quantization Index Modulation (QIM) technique may also be used to embed the STFT magnitudes. An example of such a QIM technique is described by Brian Chen and Gregory W. Wornell, "Quantization Index Modulation: A class of provably good methods for digital watermarking and information embedding," IEEE Transaction on Information Theory, Vol 47. No. 4, May 2001. pp 1423-1443, the contents of which is incorporated herein by reference.

When applying QIM techniques, the quantized DCT coefficients may be perturbed to take an even or odd value when encoding the digital audio data (the "signature"). Although this technique may be regarded as lossless it may be fragile, where embedded audio data are not preserved under common image processing operations (e.g., when brightening the image). The method may require a full control of an encoding and decoding module and, thus, in some embodiments may be less favorable, if a user is allowed to use arbitrary image editing software. Nevertheless, if such control is provided, this method can embed high quality, and high capacity audio data the host image. If the embedded target image format is JPEG, then the adaptive lattice coding technique described above may be more suitable. In certain embodiments, the QIM method may have merit by capitalizing on its fragile nature. For example, if a region in an image is modified, such modification may be detected because the lattice codes in the corresponding blocks may be corrupted or have a very low confidence level. In one exemplary embodiment, this side effect may be utilized to provide a temper detection mechanism.

The invention, as described herein by way of example, may provide, or be used to provide, a single media which integrates an image (e.g., a digital photograph) and audio (e.g., voice or speech). Thus a single file (e.g., a JPEG file) may be provided containing both the image and the audio. Further, the content (host image and audio data) of the single file may survive file format conversion. In one exemplary embodiment, a "photo search" based on audio may be performed. Digital images may thus be located based on audio data embedded therein. In one exemplary application the invention, the methods and systems described herein may be used to provide a measure of protection by embedding a user's own voice in the image to, for example, inhibit plagiarism of the image.

For the purposes of this specification, the term "image" should be broadly construed and not limited to an image such as a photograph, video clip or the like. The term "image" is intended to include any two-dimensional representation and may be an image such as a photographic image, an image of a document, text or the like.

Figure 17:
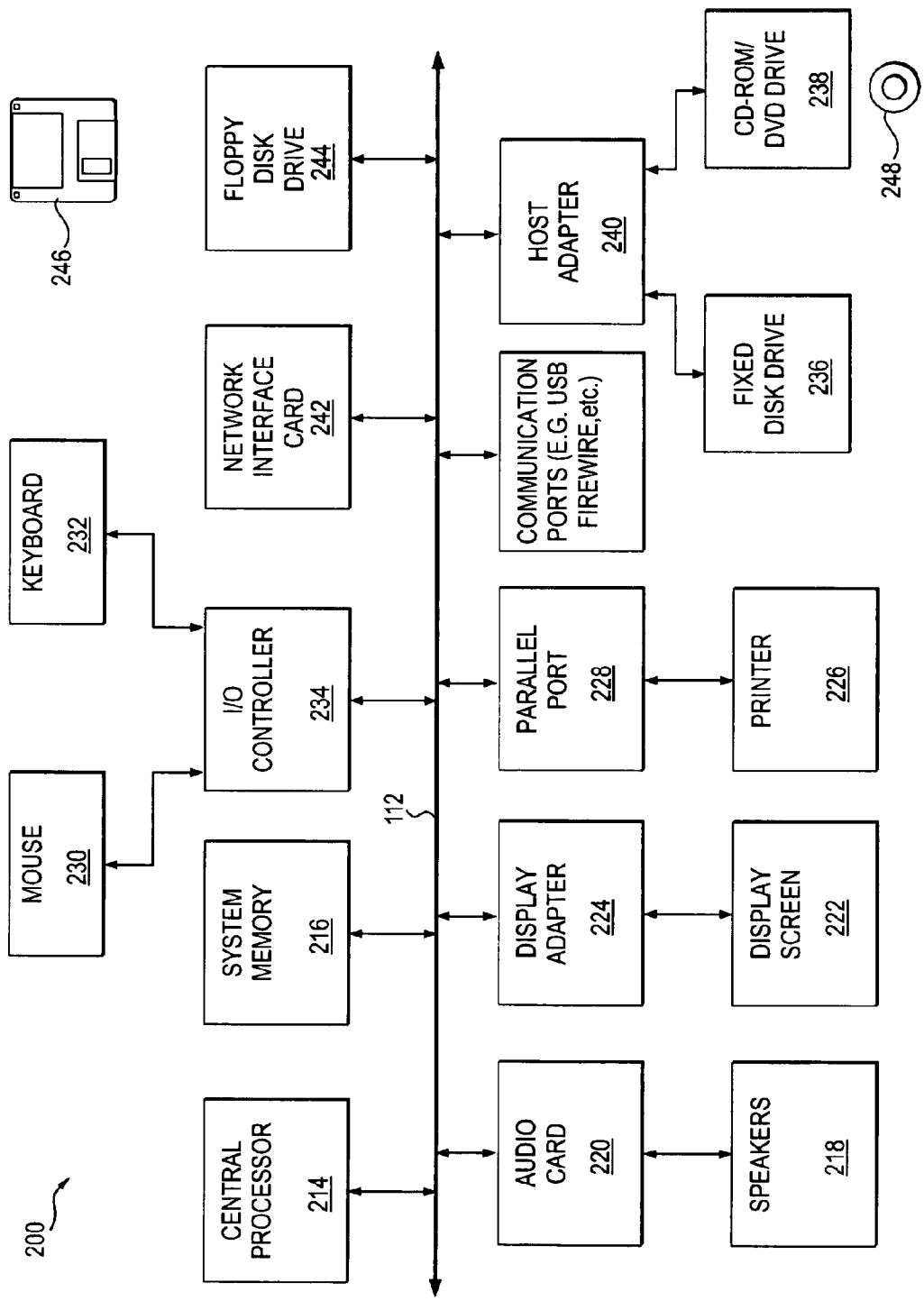
FIG. 17 shows a diagrammatic representation of machine in the exemplary form of the computer system within which a set of instructions, for causing the machine to perform any one of the methodologies discussed herein, may be executed.

FIG. 17 shows a diagrammatic representation of machine in the exemplary form of the computer system 200 within which a set of instructions, for causing the machine to perform any one of the methodologies discussed herein, may be executed. In alternative embodiments, the machine may comprise a network router, a network switch, a network bridge, Personal Digital Assistant (PDA), a cellular telephone, a web appliance or any machine capable of executing a set/sequence of instructions that specify actions to be taken by that machine.

The computer system 200 is shown to include a bus 212 that interconnects subsystems such as a central processor 214, a system memory 216, and external devices such as speakers 218 via an audio card 220, a display screen 222 via a display adapter 224, a printer 226 via a parallel port 228, a pointing device such as a mouse 230 and a keyboard 232 via an input/output (I/O) controller 234, a fixed disk drive 236 and a CD-ROM/DVD drive 238 via a host adapter 240, a network interface card 242, and a floppy disk drive 244 operative to receive a floppy disk 246.

It will be appreciated that many other devices or subsystems (not shown) can also be connected, such as a scanning device, a touch screen, and others. Also, it is not necessary for all of the devices shown in FIG. 17 to be present to practice the present invention. When the computer system is in the form of a PDA or a cellular telephone, it may not include, for example, the mouse 230, the floppy disk drive 244, the fixed disk drive 236 and so on. Furthermore, the devices and subsystems may be interconnected in different configurations than that shown in FIG. 17. The operation of a computer system 200 is readily known in the art and is not discussed in detail herein.

For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and carrier wave signals.

The software to implement some embodiments of the invention may be operatively disposed (both fully or partially) within the system memory 216, within a subsystem that couples to the bus 212 (e.g., the audio card 220, the central processor 214), or stored on storage media such as the fixed disk drive 236, the floppy disk 246, or a CD-ROM/DVD 248 that is operative with the CD-ROM/DVD drive 238.

The bus 212 can be implemented in various manners. For example, the bus 212 can be implemented as a local bus, a serial bus, a parallel port, or an expansion bus (e.g., ADB, SCSI, ISA, EISA, MCA, NuBus, PCI, or other bus architectures). The system memory 216 can be a random-access memory (RAM), a dynamic RAM (DRAM), or other memory devices.

Thus, a method and system to process a digital image have been described. In one embodiment, audio data such as a speech signal may be embedded in a still color host image. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to process a still host image in a computerized system, the method comprising:
receiving the still host image in the computerized system;
receiving an audio clip comprising audio data in the computerized system;
processing the audio data using a Short Term Fourier Transformation (STFT);
quantizing magnitude data of the short-term Fourier transform of the audio data;
discarding phase data of the short-term Fourier transform of the audio data; and
embedding the audio data that has been short-term Fourier transformed and having magnitude data quantized and phase data discarded within the still host image to transform the still host image into a still embedded image in the computerized system, such that the audio data is freely recoverable from the embedded image by extracting the audio clip from the still embedded image.

2. The method of claim 1, which comprises compressing digital data that represents the audio signal included in the audio data prior to embedding the audio data within the host image.

3. The method of claim 1, which comprises quantizing the audio data to map it to a $D_4$ Lattice code.

4. The method of claim 3, which comprises scaling a lattice code of the $D_4$ Lattice to minimize distortion the host image.

5. The method of claim 1, which comprises:
separating luminance data and chrominance data of the host image;
including the audio data in the luminance data to provide modified luminance data; and
combining the modified luminance data and the chrominance data to provide the embedded image.

6. The method of claim 5, which comprises:
processing the luminance data to provide intermediate luminance data;
performing perceptual adaptation to at least one subband of the intermediate luminance data to provide a perceptually adapted subband; and
including the audio data in the perceptually adapted subband to provide the modified luminance data.

7. The method of claim 6, which comprises:
removing the at least one subband from the intermediate luminance data to provide further intermediate luminance data; and
combining the perceptually adapted subband with the further intermediate luminance data to provide the modified luminance data.

8. The method of claim 6, which comprises:
performing an inverse transform on the modified luminance data; and
combining the luminance data that has been inverse transformed with the chrominance data to provide an embedded host that defines the digital image.

9. The method of claim 6, wherein the luminance data is processed by a discrete wavelet transform.

10. The method of claim 1, which comprises:
converting RGB components of the host image to a chrominance component and a luminance component;
processing the luminance component of the host image; and
converting the host image into RGB components.

11. The method of claim 1, which comprises:
masking a portion of the host image; and
reserving the masked portion for host image data.

12. The method of claim 1, which comprises:
masking a portion of the host image to provide a masked portion and an unmasked portion; and
embedding the audio data in both the masked portion and the unmasked portion, wherein more audio data is stored per pixel in the unmasked portion than the masked portion.

13. The method of claim 1, wherein the image is a digital photograph.

14. A system to process a still host image, the system comprising:
image processing circuitry to receive the still host image;
audio processing circuitry to receive audio data;
a Short Term Fourier Transform module to process the audio data using a Short Term Fourier Transformation (STFT);

a quantizer module to quantize magnitude data of the short-term Fourier transform of the audio data, the audio processing circuitry to discard phase data of the short-term Fourier transform of the audio data; and an embedding module to embed the audio data that has been short-term Fourier transformed and having magnitude data quantized and phase data discarded within the still host image to provide a still embedded image, such that the audio data is freely recoverable from the embedded image.

15. The system of claim 14, wherein the audio processing circuitry reduces an amount of digital data that represents the audio signal included in the audio data prior to embedding the audio data within the host image.

16. The system of claim 15, wherein the image processing circuitry processes luminance data with a discrete wavelet transform to provide intermediate luminance data whereafter the quantized magnitude data is included in the intermediate luminance data.

17. The system of claim 14, wherein the image processing circuitry processes luminance data with a discrete cosine transform to provide intermediate luminance data whereafter the quantized magnitude data is included in the intermediate luminance data.

18. The system of claim 14, wherein the audio data is quantized to provide quantized audio data, and the quantized audio data is scaled based on coefficients of a subband of the host image.

19. A non-transitory computer-readable medium embodying a sequence of instructions that, when executed by a machine, cause the machine to perform operations comprising:

receiving host still image data;
receiving an audio clip comprising audio data;
processing the audio data using a Short Term Fourier Transformation (STFT);
quantizing magnitude data of the short-term Fourier transform of the audio data;
discarding phase data of the short-term Fourier transform of the audio data; and
embedding the audio data that has been short-term Fourier transformed and having magnitude data quantized and phase data discarded within the still image data to transform the host still image into a still embedded image, such that
the audio data is freely recoverable from the embedded image by extracting the audio clip from the standalone embedded image.

20. A digital camera including:
an image capture module to capture a still host digital image;
an audio capture module to capture an audio clip comprising audio data; and
an image processing module to:
process the audio data using a Short Term Fourier Transformation (STFT);
quantize magnitude data of the short-term Fourier transform of the audio data;
discard phase data of the short-term Fourier transform of the audio data, and
embed the audio data into the still host image, such that the audio clip can be extracted from the embedded still host image.

21. A mobile telephone comprising a digital camera including:
an image capture module to capture a still host digital image;
an audio capture module to capture an audio clip comprising audio data; and
an image processing module to:
process the audio data using a Short Term Fourier Transformation (STFT);
quantize magnitude data of the short-term Fourier transform of the audio data;
discard phase data of the short-term Fourier transform of the audio data, and
embed the audio data into the still host image, such that the audio clip can be extracted from the embedded still host image.

22. A system to process a host image, the system comprising:
means for receiving a still host image;
means for receiving an audio clip comprising audio data;
means for processing the audio data using a Short Term Fourier Transformation (STFT);
means for quantizing magnitude data of the short-term Fourier transform of the audio data;
means for discarding phase data of the short-term Fourier transform of the audio data; and
means for embedding the audio data within the still host image transform the host still image into a still embedded image, such that
the audio data is freely recoverable from the still embedded image by extracting the audio clip from the still embedded image.

* * * * *

UNITED STATES PATENT AND TRADEMARK OFFICE
CERTIFICATE OF CORRECTION

| | |
|---|---|
| PATENT NO. | : 8,442,262 B2 |
| APPLICATION NO. | : 11/016366 |
| DATED | : May 14, 2013 |
| INVENTOR(S) | : Sim et al. |

It is certified that error appears in the above-identified patent and that said Letters Patent is hereby corrected as shown below:

On the Title page, in column 2, under "(57) Abstract", line 5, delete "if" and insert --is--, therefor Title page 2, in column 2, under "Other Publications", line 10, after "Processing)", insert --,--, therefor Title page 2, in column 2, under "Other Publications", line 18, delete "CA,(Jan." and insert --CA, (Jan.--, therefor Title page 2, in column 2, under "Other Publications", line 19, delete "Brian ," and insert --Brian,--, therefor Title page 2, in column 2, under "Other Publications", line 23, delete "Youngkwan ," and insert --Youngkwan,--, therefor Title page 2, in column 2, under "Other Publications", line 33, delete "Daniel ," and insert --Daniel,--, therefor Title page 2, in column 2, under "Other Publications", line 36, delete "N. ," and insert --N.,--, therefor Title page 2, in column 2, under "Other Publications", line 37, delete "2002. Proceedings ," and insert --2002, Proceedings,--, therefor Title page 2, in column 2, under "Other Publications", line 39, delete "D. ," and insert --D.,--, therefor Title page 2, in column 2, under "Other Publications", line 41, delete "2000),630-645" and insert --2000), 630-645--, therefor Title page 2, in column 2, under "Other Publications", line 42, delete "John ," and insert --John,--, therefor Signed and Sealed this
Seventeenth Day of September, 2013

Teresa Stanek Rea
*Deputy Director of the United States Patent and Trademark Office*

Title page 2, in column 2, under "Other Publications", line 46, delete "Philip ," and insert --Philip,--, therefor Title page 2, in column 2, under "Other Publications", line 47, delete "2003),5" and insert --2003), 5--, therefor Title page 2, in column 2, under "Other Publications", line 48, delete "K. ," and insert --K.,--, therefor Title page 2, in column 2, under "Other Publications", line 49, delete "quantizatuion" and insert --quantization--, therefor Title page 2, in column 2, under "Other Publications", line 50, delete "2002),1" and insert --2002), 1--, therefor Title page 2, in column 2, under "Other Publications", line 51, delete "Mark ," and insert --Mark,--, therefor Title page 2, in column 2, under "Other Publications", line 55, delete "1999),1108" and insert --1999), 1108--, therefor In the Drawings Sheet 15 of 15, Fig. 17, delete "FIREWIRE,etc.)" and insert --FIREWIRE, etc.)--, therefor In the Specification In column 2, line 17, after "may", insert --be--, therefor In column 2, line 64, delete "if", insert --is--, therefor In column 4, line 28, delete "in", insert --to--, therefor In column 5, line 40, delete "Tern" and insert --Term--, therefor In column 8, line 40, delete "of" and insert --or--, therefor (first occurrence)

In column 9, line 66, delete "|-0.5|1)" and insert --|-0.5|)--, therefor

In column 10, line 65, delete "|12.1|" and insert --|2.1|--, therefor

In column 10, line 65, delete "maybe", insert --may be--, therefor

In column 11, line 19, delete "J," and insert --J.,--, therefor

In column 11, line 19, delete "R," and insert --R.,--, therefor

CERTIFICATE OF CORRECTION (continued)
U.S. Pat. No. 8,442,262 B2

In column 14, line 62, delete "↑-12|" and insert --|-12|--, therefor

In column 15, line 20, delete "J," and insert --J.,--, therefor

In column 15, line 20, delete "R," and insert --R.,--, therefor

In column 15, line 44, delete "entire," and insert --entire--, therefor

In column 16, line 40, delete "and", insert --an--, therefor

In column 18, line 19, delete "and," and insert --and--, therefor

In column 18, line 31, delete "temper" and insert --tamper--, therefor

In the Claims

In column 20, line 11, in Claim 4, after "distortion", insert --of--, therefor